United States Patent
Orsino et al.

(10) Patent No.: US 10,959,279 B2
(45) Date of Patent: Mar. 23, 2021

(54) USER EQUIPMENT, NETWORK NODE AND METHODS IN A WIRELESS COMMUNICATIONS NETWORK

(71) Applicant: Telefonaktiebolaget LM Ericsson (publ), Stockholm (SE)

(72) Inventors: Antonino Orsino, Masala (FI); Oumer Teyeb, Solna (SE); Stefan Wager, Espoo (FI); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 5 days.

(21) Appl. No.: 16/461,599

(22) PCT Filed: Feb. 19, 2019

(86) PCT No.: PCT/SE2019/050148
§ 371 (c)(1),
(2) Date: May 16, 2019

(87) PCT Pub. No.: WO2019/194715
PCT Pub. Date: Oct. 10, 2019

(65) Prior Publication Data
US 2020/0260518 A1 Aug. 13, 2020

Related U.S. Application Data

(60) Provisional application No. 62/652,919, filed on Apr. 5, 2018.

(51) Int. Cl.
*H04W 76/15* (2018.01)
*H04W 76/19* (2018.01)
*H04W 76/38* (2018.01)

(52) U.S. Cl.
CPC .......... *H04W 76/19* (2018.02); *H04W 76/15* (2018.02); *H04W 76/38* (2018.02)

(58) Field of Classification Search
CPC ...... H04W 76/19; H04W 76/15; H04W 76/38
See application file for complete search history.

(56) References Cited

U.S. PATENT DOCUMENTS

| | | | |
|---|---|---|---|
| 2012/0281548 A1* | 11/2012 | Lin ................. | H04J 11/005 370/242 |
| 2016/0316508 A1* | 10/2016 | Hong ............... | H04W 76/15 |
| 2016/0338134 A1* | 11/2016 | Nagasaka .......... | H04W 36/08 |

FOREIGN PATENT DOCUMENTS

| | | |
|---|---|---|
| EP | 2 963 966 A1 | 1/2016 |
| WO | 2014 111027 A1 | 7/2014 |
| WO | WO-2014111027 A1 * | 7/2014 ............ H04W 24/04 |

OTHER PUBLICATIONS

3GPP TSG-RAN WG2 #97, Apr. 2017, (Ericsson: "RLM and RLF in NR", 3GPP Draft; R2-1704089—RLM and RLF in NR, 3GPP, vol. RAN WG2).*

(Continued)

*Primary Examiner* — Lakeram Jangbahadur
(74) *Attorney, Agent, or Firm* — Baker Botts, LLP

(57) ABSTRACT

A method performed by a User Equipment (UE) for handing a Radio Link Failure (RLF) on a first group of cells in a wireless communication network is provided. The UE is engaged in an ongoing communication with the wireless communication network via a first group of cells and a second group of cells. The UE detects (501) that an RLF is on one or more out of the first group of cells. The further UE sends (502) a report to a network node in the wireless communication network. The report is sent via one or more out of the second group of cells while continuing the communication with the wireless communication network.

(Continued)

The report comprises radio link information about the RLF on one or more out of the first group of cells.

18 Claims, 12 Drawing Sheets

(56) References Cited

OTHER PUBLICATIONS

3GPP TSG-RAN WG2 #102; Busan, S. Korea; Source: Ericsson; Title: PCell failure handling for Standalone NR (R2-1807038 (Resubmission of R2-1804794))—May 21-25, 2018.
3GPP TSG-RAN WG2 #97bis; Spokane, USA; Source: Ericsson; Title: RLM and RLF in NR (Tdoc R2-1704089 (updated version of R2-1702677))—Apr. 3-7, 2017.
PCT Notification of Transmittal of the International Search Report and the Written Opinion of the International Searching Authority, or the Declaration issued for International application No. PCT/SE2019/050148—May 10, 2019.

* cited by examiner

Fig. 5 Method in the UE 120

Fig. 6 Method in the network node 111, 112, 130

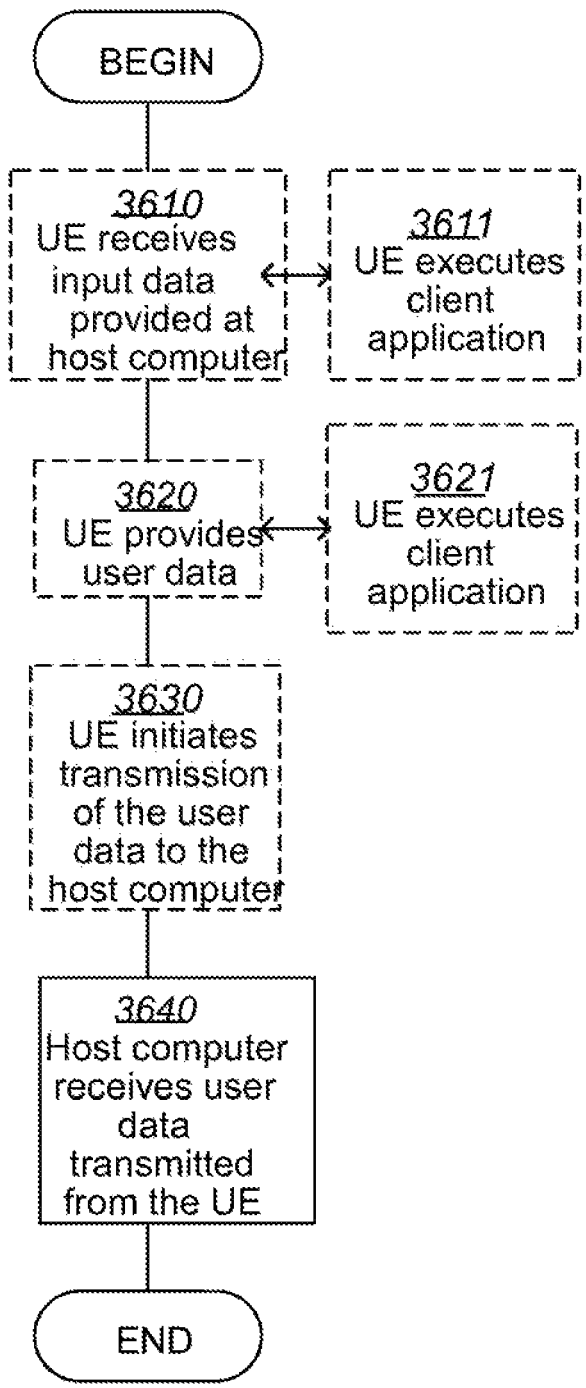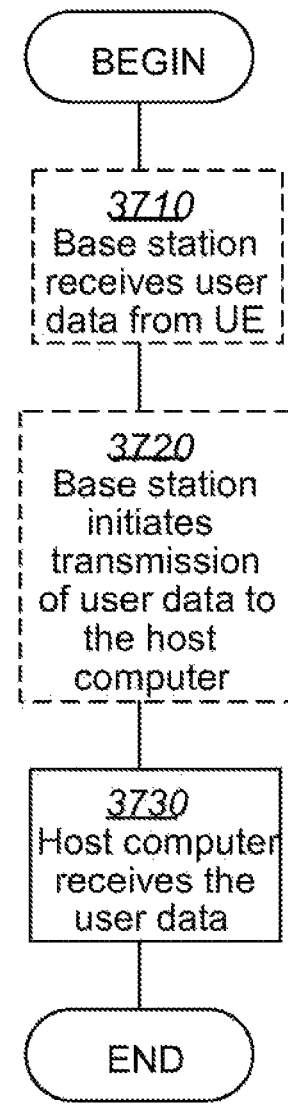
FIG. 13
FIG. 14

“USER EQUIPMENT, NETWORK NODE AND METHODS IN A WIRELESS COMMUNICATIONS NETWORK

PRIORITY

This nonprovisional application is a U.S. National Stage Filing under 35 U.S.C. § 371 of International Patent Application Ser. No. PCT/SE2019/050148 filed Feb. 19, 2019 and entitled "USER EQUIPMENT NETWORK NODE AND METHODS IN A WIRELESS COMMUNICATIONS NETWORK: which claims priority to U.S. Provisional Patent Application No. 62/652,919 filed Apr. 5, 2018 both of which are hereby incorporated by reference in their entirety.

TECHNICAL FIELD

Embodiments herein relate to a User Equipment (UE), a network node and methods therein. In some aspects, they relate to handling a Radio Link Failure (RLF on a first group of cells in a wireless communication network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRANILTE is a variant of a 3GPP radio access network wherein the radio network nodes are directly connected to the EPC core network rather than to RNCs used in 3G networks. In general, in E-UTRAN/LTE the a 3G RNC are distributed between the radio network nodes, e.g. eNodeBs LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

NR Standalone in NR non-standalone a 5G networks will be supported by existing 4G infrastructure or 5G infrastructure and in NR standalone a 5G networks will be supported by only a 5G infrastructure.

In NR standalone, but more in general in NR, an NG-RAN node is a gNB providing NR user plane and control plane protocol terminations towards a UE. Alternatively, in case of LTE connected 5GC core network, an NG-RAN node is a ng-eNB, providing E-UTRA user plane and control plane protocol terminations towards the UE.

FIG. 1 shows the User Plane Protocol Stack for the NR user plane, with Service Data Adaptation Protocol (SLAP), Packet Data Convergence Protocol (PDCP), Radio link control (RLC) and Medium Access Control (MAC), and Physical Layer (PHY) sublayers, terminated in gNB on the network side. PHY in FIG. 1 stands for Physical Layer.

The NR control plane architecture is shown in FIG. 2 with a UE, a gNB, a Mobility Management Function (AMF), and the layers: Non Access Stratum (NAS), Radio Resource Control (RRC), PDCP, RLC, MAC and PHY.

Carrier Aggregation (CA)

When CA is configured, a UE only has one RRC connection with the network. Further, at RRC connection establishment, re-establishment and/or handover, one serving cell provides the NAS mobility information, and at RRC connection re-establishment and/or handover, one serving cell provides the security input. This cell is referred to as the Primary Cell (P Cell). In addition, depending on UE capabilities, Secondary Cells (SCells) may be configured to form together with the PCell a set of serving cells. The configured set of serving cells for a UE therefore comprises one PCell and one or more SCells. Further, when dual connectivity is configured, it may be the case that one carrier under the Secondary Cell Group (SCG) is used as the Primary SCell (PSCell). Hence, in this case there may be one PCell and one or more SCell(s) over a Master Cell Group (MCG) and one PSCell and one or more SCell(s) over the SCG.

The reconfiguration, addition and removal of SCells may be performed by RRC. At intra-RAT handover, RRC may also add, remove, or reconfigure SCells for usage with the target PCell. When adding a new SCell, dedicated RRC signalling is used for sending all required system information of the SCell i.e. while in connected mode, UEs need not acquire broadcasted system information directly from the SCells.

The configured set of serving cells for a UE therefore comprises one PCell and one or more SCells:

For each SCell the usage of uplink resources by the UE in addition to the downlink ones is configurable, the number of DL Secondary Component Carrier (SCC)s configured is therefore always larger than or equal to the number of UL SCCs and no SCell can be configured for usage of uplink resources only:

From a UE viewpoint, each uplink resource only belongs to one serving cell,

The number of serving cells that can be configured depends on the aggregation capability of the UE;

The PCell can only be changed with handover procedure, i.e. with security key change and, unless a Random Access Channel (RACH)-less Handover (HO) is configured, with RACH procedure;

The PCell is used for transmission of a Physical Uplink Control CHannel (PUCCH);

If Dual Connectivity (DC) is not configured, one additional PUCCH can be configured on an SCell, the PUCCH SCell;

Unlike SCells, a PCell cannot be de-activated:

Re-establishment is triggered when a PCell experiences radio Link Failure (RLF), not when an SCells experience RLF;

NAS information is taken from PCell.

Radio Link Failure

In LTE, a UE considers a RLF to be detected when:
i. Upon detecting, a certain number of out of sync indications from the lower layers associated with the PCell within a given time, or
ii. upon random access problem indication from MAC, or
iii. UI upon indication from RLC that the maximum number of retransmissions has been reached for a Signaling Radio Bearer (SRB) or for a Data Radio Bearer (DRB).

When RLF is detected, the UE prepares an RLF report, which includes, among other information, the measurement status of the serving and neighbor cells at the moment when RLF was detected, goes o IDLE mode, select cell following LE mode cell selection procedure, the selected cell may be the same serving node and/or cell or another node and/or cell, and start the RRC re-e n procedure, with a cause value set to rlf-cause.

In particular, when the RLF failure happens on PCell, a RRC connection establishment procedure is triggered. On the other side, when the failure happens on the SCell, RLF is triggered.

Duplication in NR

It has been agreed to in duplication of packets for the sake of enhancing reliability. Duplication may be applied at either the DC level or CA level. Usually, in case of CA level duplication, two RLC entities are mapped to the same PDCP entity, i.e., one RLC entity for the PCell and another one for the SCell. With CA level duplication, logical channel, also referred to carrier, restriction is made so that one RLC entity is mapped only to one of the carriers comprising the CA tuple, so that diversity can be ensured, i.e. the original and the duplicate will not be sent over the same carrier. CA duplication may be enabled both for DRBs and SRBs. In the following, if the CA level duplication was setup for a DRB(s), then it is assumed that there is also CA level duplication on SRBs.

Therefore, differently from LTE, where the PCell and SCell where mapped to one RLC and one PDCP entity, as shown in FIG. 3, in NR there one RLC entity for each PCell and SCell(s) linked with one PDCP entity that take care of the duplication. FIG. 3 depicts a CA duplication in stand-alone NR.

SUMMARY

An object of embodiments herein to prove the performance of a wireless communications network using first and second cell groups for communication.

According to an aspect of embodiments herein, the object is achieved by a method performed by a User Equipment, UE, for handling a Radio Link Failure, RLF, on a first group of cells in a wireless communication network. The UE is engaged in an ongoing communication with the wireless communication network via a first group of cells and a second group of cells. The UE detects (501) that an RLF is on one or more out of the first group of cells. The further UE sends (502) a report to a network node in the wireless communication network. The report is sent via one or more out of the second group of cells while continuing the communication with the wireless communication network. The report comprises radio link information about the RLF on one or more out of the first group of cells.

According to another aspect of embodiments herein, the object is achieved by, method performed by a network node for handling a Radio Link Failure, RLF, on a first group of cells in a wireless communication network. A User Equipment, UE is engaged in an ongoing communication with the wireless communication network via a first group of cells and a second group of cells. The network node obtains information about RLF on one or more out of the first group of cells. The network node further deactivates any one out of: the one or more out of the first group of cells, and the duplication, while continuing the ongoing communication the UE is engaged in.

According to a further aspect of embodiments herein, the object is achieved by a User Equipment, UE, for handling a Radio Link Failure, RLF, on a first group of cells in a wireless communication network. The UE is adapted to be engaged in an ongoing communication with the wireless communication network via a first group of cells and a second group of cells. The UE is configured to:

Detect that an RLF is on one or more out of the first group of cells, and, send a report to a network node in the wireless communication network 100 via one or more out of the second group of cells while continuing the communication with the wireless communication network. The report comprises radio link information about the RLF on one or more out of the first, group of cells.

According to a yet further aspect of embodiments herein, the object is achieved by a network node for handling a Radio Link Failure. RLF, on a first group of cells in a wireless communication network, wherein a User Equipment, UE is adapted to be engaged in an ongoing communication with the wireless communication cells and a second group of cells, the network node being configured to:

Obtain information about RLF on one more out of the first group of cells and deactivate any one out of: the one or more out of the first group of cells, while continuing the, ongoing communication the UE is engaged in.

BRIEF DESCRIPTION OF THE FIGURES

FIGS. 11-14 are flowcharts illustrating methods implemented in a communication system including a host computer, base station and a user equipment.

DETAILED DESCRIPTION

Figure 1:
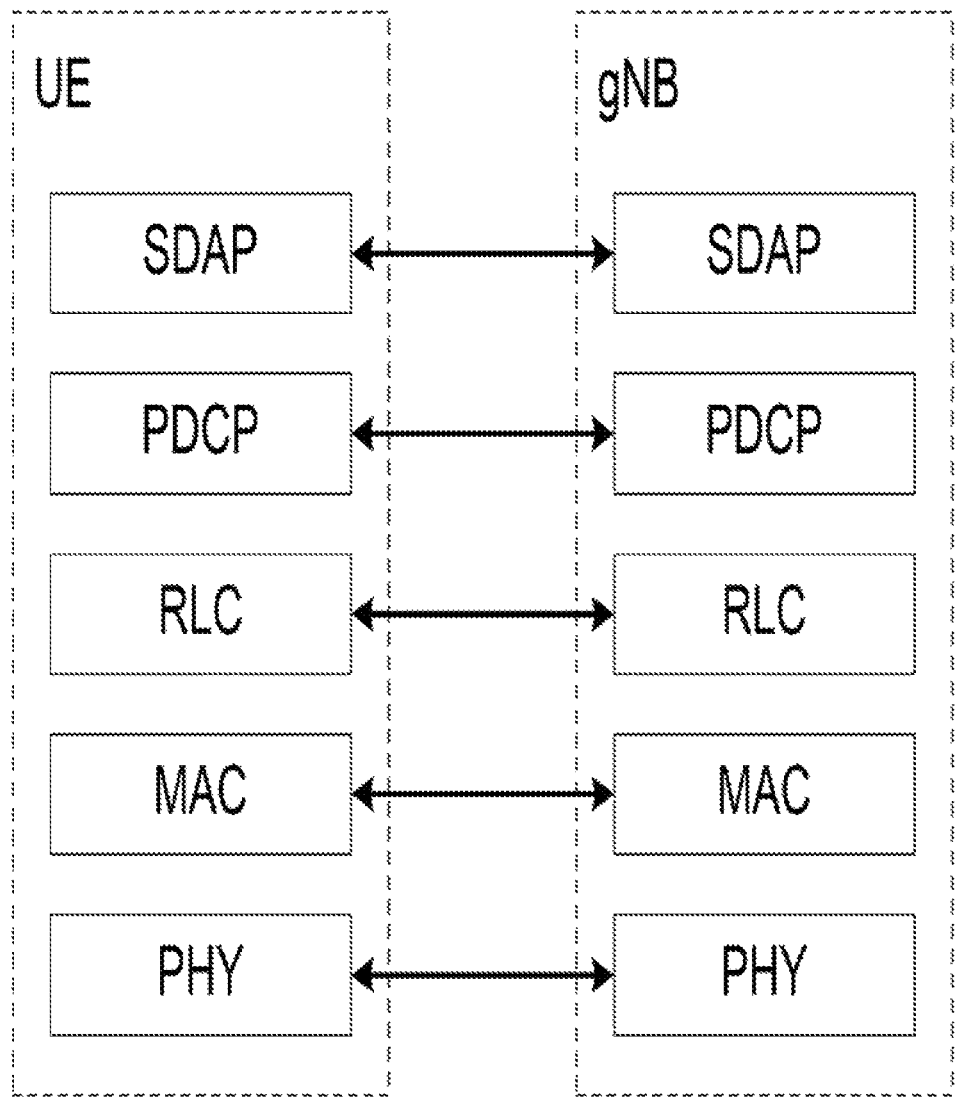
FIG. 1 is a schematic diagram illustrating prior art.

As a part of developing embodiments herein the inventors identified a problem which first will be discussed.

PUCCH on SCell

Since CA aggregates multiple independent carriers for parallel and simultaneous communications, scheduling and data transmission and/or reception are done independently by each Component Carriers (CC). Hence, most of the conventional and non-CA LTE functions may be reused for each CC. On the other hand, in Release 12 CA, only the Primary Cell) supports the PUCCH that transmits Uplink Control Information (UCI) such as ACKnowledgement (ACK)/Negative ACK (NACK) for all the downlink CCs and Channel State Information (CSI) for all the downlink CCs, and Scheduling Requests (SR) for uplink. This is to avoid mandating more than one uplink CC in CA. Furthermore, having PUCCH on PCell only allows the U E to use the unified UCI transmission framework regardless of its uplink CA capability. However, if a certain LTE carrier is used as the PCell for many UEs configured with CA, there may be a shortage of uplink radio resources due to the increased PUCCH load on that carrier. A typical example is CA operating on heterogeneous networks where many small cells are deployed in the coverage of a macro cell. The relatively low-powered small cells are deployed in high traffic areas with different frequencies from that of the macro cell. In areas where these small cells are overlaid on the macro cell, the UTE may be configured with CA for the small cells and the macro cell.

In order to solve this issue, 3GPP Release 13 introduced the new function to a PUCCH configuration for a Secondary Cell (SCell) in addition to the PCell in uplink CA. When CA is performed with this function, CCs are grouped together either with the PCell or the SCell with PUCCH (PUCCH-SCell). The UE sends UCI for CCs within each group by using the PCell or PUCCH-SCell. With this new function, uplink radio resource shortages can be resolved by offloading UCI from macro cell to the small cells while keeping the macro cell as the PCell.

As discussed in the previous section, in case of radio link failure on the PCell, legacy solution is that RRC connection re-establishment is triggered. However, since in NR there is one RLC entity for the PCell and one or mare RLC entity(ies) for the SCell(s), in this case it is possible to one on which carrier the RLF happened.

E.g. in case of standalone NR with CA activated, upon an RLF over a PCell, the solution is to call an RRC re-establishment thus (re)setting up the whole radio from scratch. However, this procedure causes a considerable service interruption time that cannot be tolerated, for example, when considering Ultra-Reliable and Low-Latency Communication (URLLC).

Some example embodiments herein aims at avoiding an RRC re-establishment by sending a PCell-RLF report to the network via the SCell that may take the necessary action of replacing the failed PCell with the SCell, performing an RRC reconfiguration, or deactivating CA duplication and continue transmissions via the SCell. In this way interruptions in the connectivity and signaling overhead can be avoided.

Some embodiments herein relate to Primary Cell Failure Handling Standalone NR. According to an example of embodiments herein, the UE instead of triggering RRC connection re-establishment sends a PCell-RLF report to the network node via the SCell without causing an interruption in the connectivity.

Figure 4:
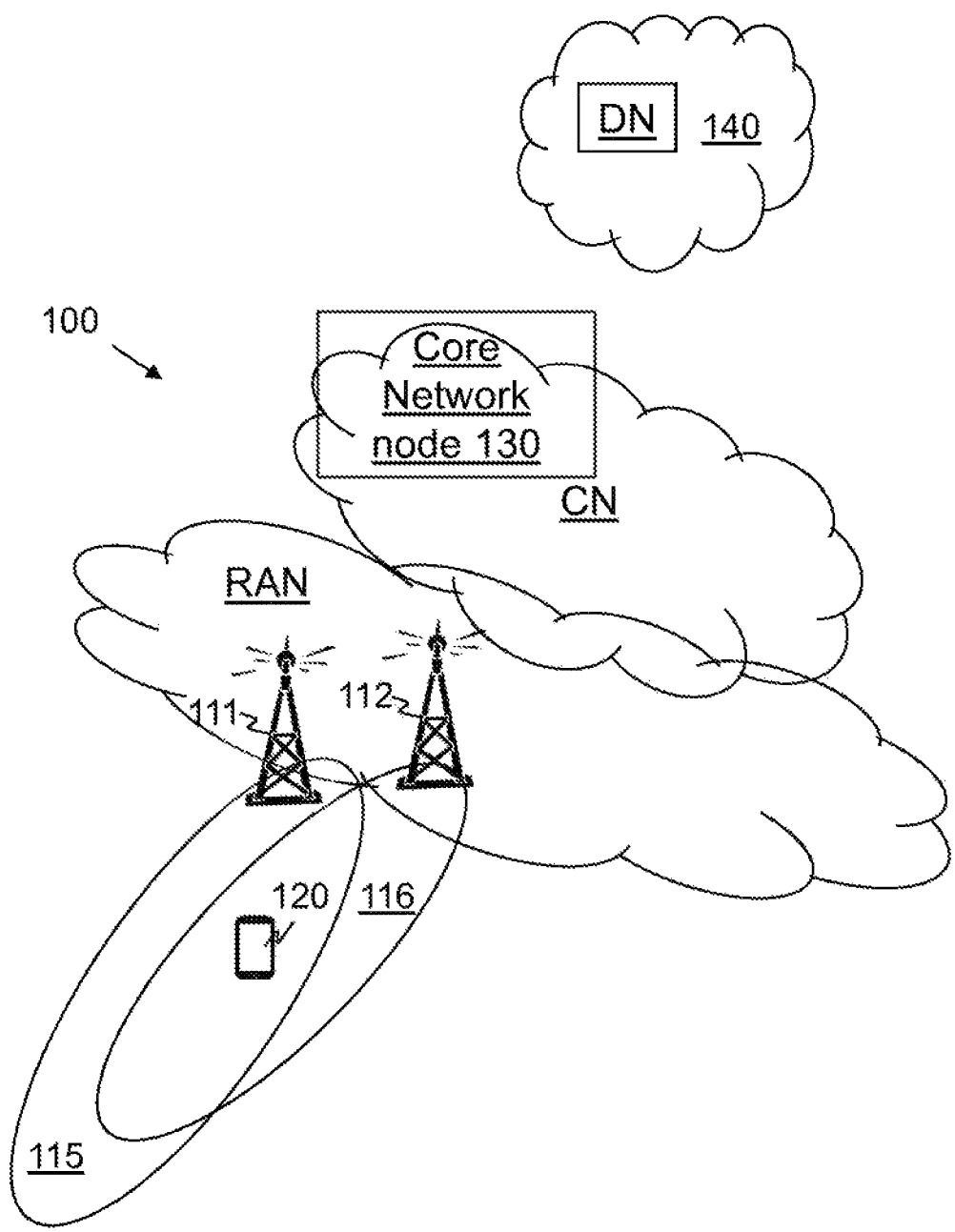
FIG. 4 is a schematic block diagram illustrating embodiments of a wireless communications network.

Embodiments herein relate to wireless communication networks in general. FIG. 4 is a schematic overview depicting a wireless communications network 100. The wireless communications network 100 comprises one or more RANs and one or more CNs. The wireless communications network 100 may use a number of different technologies, such as Wi-Fi, Long-Term Evolution (LTE), LTE-Advanced, 5G, New Radio NR), Wideband Code Division Multiple Access (WCDMA), Global System for mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Network nodes operate in the wireless communications network 100 such as a first network node 111 and a second network node 112. The first network node 111 provides radio coverage over a geographical area, a service area referred to as a first group of cells 115 e.g. comprising one or more first cells such as one or more PCells, which may also be referred to as a beam or a beam group of first radio access technology (RAT), such as 5G, LTE, Wi-Fi or similar. The second network node 112 also provides radio coverage over a geographical area, a service area referred to as a second group of cells 116 e.g. comprising one or more second cells such as one of more SCells, which may also be referred to as a beam or a beam group of first radio access technology (RAT), such as 5G, LTE, Wi-Fi or similar. The first and second network nodes 111, 112 may each be a NR-RAN node, transmission and reception point e.g., a base station, a radio access network node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area sewed by the respective first and second network node 111, 112 depending e.g. on the first radio access technology and terminology used. The respective first and second network node 111, 112 network nodes may be referred to as serving radio network nodes and communicates with a UE with Downlink (DL) transmissions to the UE and Uplink (UL) transmissions from the UE.

A number of UEs operate in the wireless communication network 100, such as a UE 120. The UE 120 may be a mobile station, a non-access point (non-AP) STA, a STA, a user equipment and/or a wireless terminals, that communicate via one or more Access Networks (AN), e.g. RAN, e.g. via the first and/or second network nodes 111, 112 to one or more core networks (CN) comprising at least one New Generation Core (NGC) node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may in a first aspect be performed by the UE 120, and in a second aspect by any of the first network node 111, second network node 112 and the core network node 130 which nodes are referred to as the network node 111, 112, 130. As an alternative, a Distributed Node (DN) and functionality, e.g. comprised in a cloud 140 as shown in FIG. 1, may be used for performing or partly performing the methods.

In LTE CA without carrier restriction, the data from any RLC entity may be mapped to any of the serving cells, e.g first group of cells 115 and the second group of cells 116, in this example the PCell or Scell. Thus, retransmissions of a certain RLC PDU may be sent via different carriers. e.g. the first transmission via the PCell, the first retransmission via the SCell1, the second retransmission via the PCell, the third retransmission via SCell2, etc. . . . . . As the UE 120 is not required to keep track of this, when the maximum number of RLC retransmissions is reached, it is not possible to determine whether the PCell or a particular SCell is causing this problem. Thus, the UE is 120 required to trigger RLF. If considered that in LTE the frequencies and/or spectrum available is limited, i.e., from 800 MHz to around 3 GHz, experiencing bad radio link conditions to one carrier most likely will reflect the same situation on the other ones. Thus, the differentiation of which carrier is experiencing bad radio conditions may not be that relevant.

In NR, when CA level duplication is enabled, there is a logical channel restriction, i.e. a certain duplicated RLC entity is mapped to a particular carrier, and there is one RLC entity for the PCell and one or more RLC entity(ies) for the SCell(s). Thus, when the maximum number of RLC retransmissions is reached, embodiments herein may identify the carrier that was being used for the concerned RLC. Thus, according to example embodiments herein, when the RLF happens on the PCell, instead of triggering RRC connection re-establishment the UE 120 sends a report, e.g., PCell-RLF, via the SCell to the network that eventually may take the necessary actions. The main advantage of this is that the RRC connection re-establishment procedure with a consequent connectivity interruption is avoided. This is particularly important when considering use cases with stringent requirements in terms of reliability and latency, e.g., URLLC, where triggering RRC connection re-establishment would cause an interruption time that may not be tolerable.

Further, this is especially relevant for NR due to the wide range of frequencies that may be used, spanning from 100s of MHz up to 100 GHz, thus resulting in a wide range of different channel behavior under the same network conditions. Therefore, in case of CA level duplication on NR, the UE 120 may use different frequencies in the carriers being used for duplication that are quite far to each other when considering the overall radio spectrum. Hence, having a bad radio link on one of them does not necessarily indicate that the channel quality is also bad on the other carrier, imagine one using around 1 GHz frequency and another using 606 Hz.

In embodiments herein, mechanisms are provided to avoid unnecessary re-establishment or reconfigurations, and the unnecessary signaling overhead and service interruption due to that, when RLF of one or more cells of the first group of cells such as e.g. a PCell RLF has been detected.

The wording "an RLF on one or more out of the first group of cells" when used herein means and can be used interchangeable with the wording "an RLF is on one or more cells out of the first group of cells."

Further, the wording "one or more out of the second group of cells" when used herein means and can be used interchangeable with the wording "one or more cells out of the second group of cells".

Figure 5:
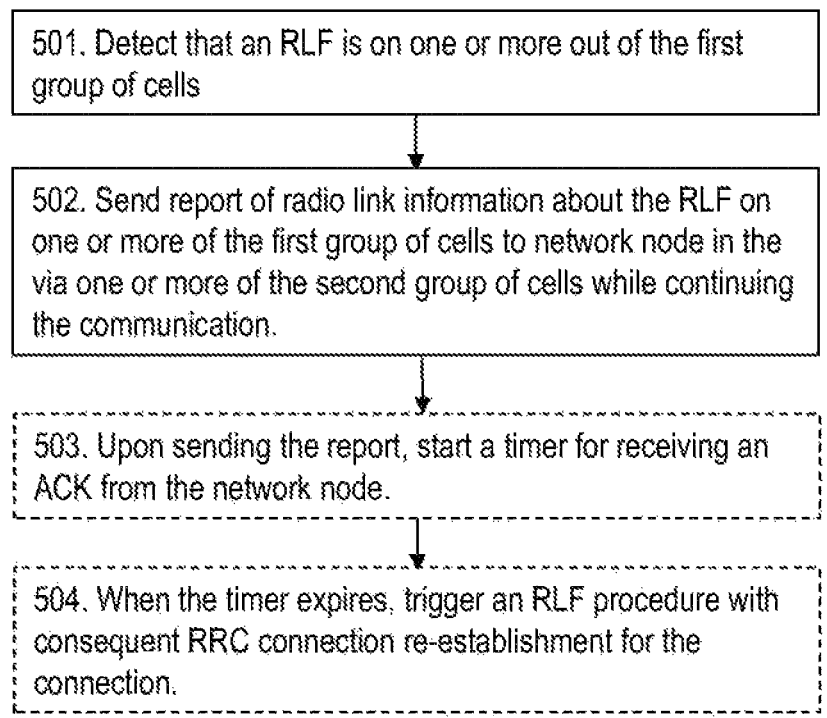
FIG. 5 is a flowchart depicting embodiments of a method in a UE.

FIG. 5 shows an example method in the UE 120 for handling an RLF on a first group of cells 115 in the wireless communication network 100. The UE 120 is engaged in an ongoing communication with the wireless communication network 100 via the first group of cells 115 and the second group of cells 116. This means that the UE 120 is engaged in an ongoing communication with the wireless communication network 100 via one or more cell out of the first group of cells 115, e.g. a PCell, and one or more cells out of the second group of cells 116, e.g. an SCell.

The first group of cells may comprise one or more PCells, and the second group of cells may comprise one or more SCells.

The communication may be represented by a duplication according to any one out of: A CA level duplication on NR, or a DC level duplication on NR.

E.g. In addition, the method may be applied also when duplication is not active and there is a flow control between the first group of cells such as one or more PCells, and a second group of cells such as one or more SCells. That means that the UE 120 transmits over one of those and the flow is switched between one of them by the network.

E.g., in the ongoing communication the UE 120 transmits data over one or more PCells or one or more SCells and the data transmission flow is switched between one of them by the network. This means that the UE 120 may alternate the active data transmission between one or more PCell and one or more SCell.

The method comprises the following actions, which actions may be performed in any suitable order. Dashed boxes represent optional method steps.

In short, the method comprises one or more of the following actions:

In Action 501, the UE 120 detects that an RLF has occurred on one or more of the first group of cells 115.

In Action 502, the UE 120 sends a report to the network node 111, 112, 130 in the wireless communication network 100 via one or more of the second group of cells 116 while continuing the ongoing communication with the wireless communication network 100. The report comprises radio link information about the RLF on one or more out of the first group of cells 115. The report e.g. indicates to the network node 110 that connectivity is not available anymore, and the network node 112, 130, i.e. the second network node 112 may take the necessary actions.

In some embodiments, upon sending the report via one or more out of the second group of cells 116 the UE 120 may in Action 503, start a timer, e.g. a waiting timer, for receiving an acknowledgement from the network node,111, 112, 130.

When the timer e.g. the waiting timer expires in these embodiments, the UE 120 may in Action 504 trigger a RLF procedure with consequent RRC connection re-establishment for the communication such as e.g. the connection.

In more detail, the method comprises one, or more of the following actions: The actions will be yet further explained in paragraphs after the method actions.

Action 501.

The UE 120 detects that an RLF is on one or more out of the first group of cells 115. E.g, the UE 120 detects that an RLF is on one or more cell out of the first group of cells 115, e.g. the PCell.

The RLF on one or more of the first group of cells 115, e.g. one or more PCell out of the PCells, is detected when any one or more out of:

When detecting that a maximum number of RLC re-transmissions is reached, when a measured Reference Signal Received Power (RSRP) is below a threshold such as a certain limits, when the UE 120 fails to decode a Physical Downlink Control Channel (PDCCH) due to power signal quality, when the UE 120 fails to decode a Physical Downlink Shared Channel (PDSCH) due to power signal quality, and when a counted number of failures that resulted from using a carrier is above a threshold, wherein the UE 120 employing CA keeps tracks of the association of an RLC entity and the carrier to which the RLC packets from that entity are being sent to, and it also counts the number of failures that resulted from using that carrier.

In some embodiments, upon the RLF detection, the UE 120 may start a Radio Link Monitoring (RLM), on at least one of the SCells.

In some of these embodiments, the starting of the RLM may be performed on any one out of: The SCells with the highest signal strength or quality, or the SCells on the lowest carrier frequency, or the SCells configured for RLM by the network.

Action 502.

Instead of triggering RRC connection re-establishment, the UE 120 will send a PCell-RLF report to the network node via one or more cells out of the second group of cells 116 such as e.g. the SCell without causing an interruption in the connectivity.

Thus, the UE 120 sends a report to a network node 111, 112, 130 in the wireless communication network 100. The report is sent via one or more out of the second group of cells 116, while continuing the communication with the wireless communication network 100. The report comprises radio link information about the RLF on one or more out of the first group of cells 115. The report may e.g. indicate to the network node 111, 112, 130 that connectivity is not available anymore.

The report may indicate to the second network node 112 to handle the RLF on one or more out of the first group of cells 115 while continuing the communication with the wireless communication network 100. This means that e report may indicate to the second network node 112 to handle the RLF on one or more cells out of the first group of cells 115 while continuing the communication with the wireless communication network 100. The report may be represented by a PCell-RLF report, Action 503.

Upon sending the report via one or more out of the second group of cells 116. The UE 120 may start a timer for receiving an acknowledgement from the network node, 112, 130. The timer may e.g. be a waiting timer. This is to avoid that the UE 120 waits an infinite time for receiving an acknowledgement from the network node 111, 112, 130 that may come or not.

Action 504.

When the timer expires, e.g. the waiting timer, the UE 120 triggers an RLF procedure with consequent RRC connection re-establishment for the communication, such as e.g. the connection.

Figure 6:
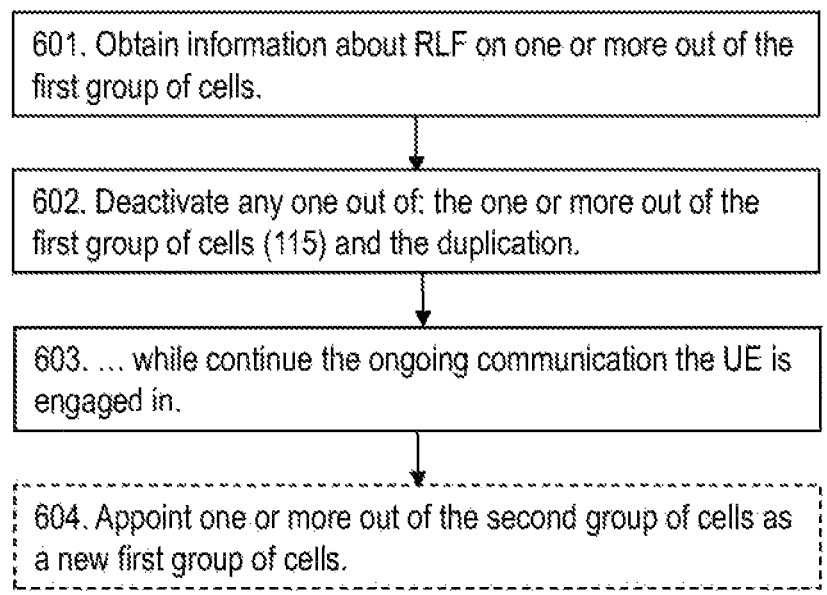
FIG. 6 is a flowchart depicting embodiments of a method in a network node.

FIG. 6 shows an example method performed in the network node 111, 112, 130 perspective. The method is for handling an RLF that has occurred on one or more first cells in the first group of cells 115 in the wireless communication network 100. The UE 120 is engaged in an ongoing communication with the wireless communication network 100 via the first group of cells 115 and the second group of cells.

As mentioned above, this means that the UE 120 is engaged in an ongoing communication with the wireless communication network 100 via one or more cell out of the first, group of cells 115, e.g. a PCell, and one or more cells out of the second group of cells 116, e.g. one or more SCell.

The first group of cells may comprise one or more PCells, and the second group of cells may comprise one or more SCells.

The communication may be represented by a duplication according to any one out of: A CA level duplication on NR, or a DC level duplication on NR.

The method comprises the following actions, which actions may be performed in any suitable order. Dashed boxes represent optional method steps.

In short, the method comprises one or more of the following actions.

In Action 601 the network node 111, 112, 130 obtains information about RAF on one or more out of the first group of cells 115.

In Action 602, the network node 111, 112, 130 deactivates any one out of: the one or more out of the first group of cells 115 and the duplication, such as e.g. the CA duplication tor the UE 120, while in Action 603, continuing the ongoing communication the UE 120 is engaged in.

In some embodiments, wherein one or more out of the second group of cells 116 is deactivated, the network node 111, 112, 130 may in Action 604, appoint one or more out of the second group of cells 116 as a new first group of cells 115.

In more detail, the method comprises one or more of the following actions: The actions will be yet further explained in paragraphs after the method actions.

Action 601.

The network node 111, 112, 130 obtains information about RLF on one or more out of the first group of cells 115. This means that the network node 111, 112, 130 obtains information about RLF on one or more cells out of the first group of cells 115.

In some embodiments the information about RLF on the PCell 115 is obtained via any one out of:

Received in a report from the UE 120 via one or more out of the second group of cells 116, which report comprises radio link information about the RLF on the one or more out of the first group of cells 115, and detected by the network node 112, 130 via monitoring the one or more out of the first group of cells 115.

The report may be represented by a PCell-RLF report.

Action 602 and 603.

The network node 111, 112, 130 deactivates (Action 602) any one out of: The one or more out of the first group of cells 115, and the duplication, such as e.g. the CA duplication for the UE 120, while continuing (Action 602) the ongoing communication the UE 120 is engaged in.

This means in some embodiments that the network node 111, 112, 130 deactivates one or more cells out of the first group of cells 115, while continuing the ongoing communication the UE 120 is engaged in.

This means in some alternative embodiments that the network node 111, 112, 130 deactivates the duplication, such as e.g, the CA duplication for the UE 120, while continuing the ongoing communication the UE 120 is engaged in.

The ongoing communication that the UE 120 is engaged in may be continued via the one or more out of the second group of cells 116. This means that the ongoing communication that the UE 120 is engaged in, may be continued via the one or more cells out of the second group of cells 116.

Action 604.

In some embodiments, one or more out of the second group of cells 116 is deactivated. This means that one or more cells out of the second group of cells 116 are deactivated. In these embodiments, the network node 111, 112, 130 may appoint one or more out of the second group of cells 116 as a new first group of cells 115. This means that the network node 111, 112, 130 may appoint one or more cells out of the second group of cells 116 as a new first group of cells 115. E.g. the network node 111, 112, 130 may appoint an SCell as a new PCell.

The above embodiments will now be further explained and exemplified below. It should be noted that the wording Master Node (MN) may be interchangeably used with the first network node 111 and the wording Secondary Node (SN) may be interchangeably used with the first network node 111.

It should be noted that though it is focused herein on the NR standalone case, the embodiments herein are also applicable to non-standalone cases such as LTE-NR DC where LTE is the master, i.e. the first network node 111 and NR is the secondary node (EN-DC), i.e. the second network node 112. Further in NE-DC where NR is the master node i.e. the first network node 111 and LTE is the secondary node, i.e. the second network node 112. Further in (NN)NR-DC where both the master and secondary nodes are NR nodes, or even between NR and other RATs. Some examples of possible behaviors in case of NR non-standalone are given in both the UE 120 and network node 111, 112, 130 embodiments. EN is E-UTRA-NR. NE is NR-E-UTRA, and NN(NR) is NR-NR).

According to embodiments herein, when CA duplication is active in standalone NR, the UE 120 upon detecting radio link failure on the PCell, instead of triggering RRC connection re-establishment may send a RLF report, e.g., PCell-RLF, via the SCell to the network such as the first network node 111, that may take the necessary actions of replacing the failed PCell with the SCell, performing an RRC reconfiguration, or deactivating CA duplication and continue transmissions via the SCell.

UE 120 Examples

In the examples herein the terms first group of cells and PCell may be used interchangeably and terms second group of cells and SCell may be used interchangeably.

In one example, the UE 120 employing CA, when detecting that the maximum number of RLC re-transmission is reached, sends a PCell-RLF report to the network node 111, 112, 113. Yet in another example, the maximum number of RLC re-transmission is counted separately on the two or more carriers employed, i.e., one of the PCell, and one (or more) of the SCell(s).

In another example, the RLF is detected when the measured RSRP is too low, under a certain limit. Yet, in one example, the RLF is detected when the UE 120 fails to decode the PDCCH due to power signal quality, e.g, low RSRP, and/or Reference Signal Received Quality (RSRQ). Also, in another example, the RLF is detected when the UE 120 fails to decode PDSCH due to power signal quality, e.g. low RSRP, RSRQ.

In one example, the UE 120 employing CA keeps tracks of the association of the RLC entity and the carrier to which the RLC packets from that entity are being sent to. It may also counts the number of failures that resulted from using that carrier. In another example, the failure count of the carrier is per RLC packet. That is, several failure counters, i.e. one or more failure counters, may be initiated whenever an RLC packet is sent over a given carrier and incremented each time there is a failure. If the RLC packet is successfully sent, the failure count for that counter associated with the carrier and the concerned RLC packet is removed.

In another example, when the UE 120 detects a failure of the PCell, it sends the PCell-RLF report via the SCell to the serving network node such as the second network node 112 or the network node 111, 112 130. In one of the examples, the PCell-RLF report is a new RRC message or a harmonized message that will be defined to address partial failure scenarios such as SCG Failure Information (SCGFailureInformation), SCell-RLF and the PCell-RLF.

In one example, upon sending the PCell-RLF report via the SCell to the network node111, 112 130, the UE 120 stops CA duplications and stops UL traffic on the failed carrier. In another example, the UE 120 upon sending the PCell-RLF report via the SCell, starts forwarding the PCell traffic over the SCell.

Since radio link monitoring is performed only on the PCell, when sending the PCell-RLF via the SCell, the UE 120 has no guarantee that the SCell is not failed, or is going to fail, at that moment. To avoid this problem, in one example the UE 120 upon sending the PCell-RLF report via the SCell starts a timer such as a waiting timer for receiving an acknowledgement (ACK) from the network node111, 112 130.

In one example, the acknowledgment is an RRC connection re-configuration. In another example, the acknowledgment is a response message to PCell-RLF report or similar failure report.

In an example, the waiting timer that the UE 120 starts upon sending the PCell-RLF report via the SCell is a new RRC timer. Yet in another example, the waiting timer is one of the existing timers, such as T310 or T311 used in the radio link detection an recovery procedures.

In another example, upon the expiry of the waiting timer, the UE 120 triggers legacy RLF procedure with consequent RRC connection re-establishment.

In another example, upon RLF detection, the UE 120 starts RLM on at least one of the SCell(s) such as the one with the highest signal strength or quality, or the one on the lowest carrier frequency, or the one configured for RLM by the network, e.g. in case of PCell-RLF. The RLM parameters, such as filtering parameters, timers, thresholds, may be the same as the RLM parameters configured for PCell or could be defined separately for SCell(s).

In another example, a UE 120 is configured with CA level duplicated SRB1, one over the PCell and one over the SCell, and upon detecting RLF over the PCell the UE 120 uses the SRB1 over the SCell to send the PCell-RLF report.

In another example, the UE 120 is configured with a "just in case" CA level duplicated SRB1, one over the PCell and one over the SCell, where the usage over the SCell is not active, i.e. SRB1 data is pushed only via the RLC associated with the PCell. Upon detecting RLF over the PCell, the UE 120 may activate the usage of the RLC/SCell, i.e. that RLC associated with the SCell, and sends the PCell RLF only using that RLC associated with that SCell. In another sub-example, the UE 120 activates the usage of the RLC associated with the SCell even before the PCell RLF is detected. I.e. an indication of an RLF, a possible and/or potential RLF or an upcoming RLF, e.g when a measurement of the PCell falls below a certain value configured by the network. This time the UE 120 may be configured to, use duplication on both or just use the SCell for sending SRB1 data.

Alternatively, if there is some scheduling grant already available on the SCell that may be readily used for sanding the PCell RLF, the UE 120 may use such scheduling grant to send the PCell-RLF, indifferently if SBR1 has been duplicated over PCell and one SCell or not. In one example, if DC is enabled, i.e., there is a master node (MN) and secondary node, if the radio link failure happens on the PSCell, i.e. the concerned CA duplication was for an SCG or SCG split bearer, the UE 120 may trigger SCG failure and send the SCGFailureInformation to the MN that can take the necessary actions. The MN may be the first network node 111. Alternatively, in another example, instead of triggering SCG failure the UE 120 sends a new report, e.g. a PSCell RLF report, towards the secondary Node (SN). The SN may be the second network node 112. This may be done via an SRB3 that is already "prepared" for duplication and may use the SCell to send the report, the same way as described for SRB1 above, or it may be even that the SRB3 is associated to use the SCell without duplication. Even without SRB3, the UE 120 may send the data via an embedded SRB1 towards the MN, which is then forwarded to the SN.

In all the above examples, the UE 120 may also include latest measurements, regarding the PCell and/or the SCells and/or neighbor cells, in the failure report, PCell-RLF, PSCell RLF, SCG failure, etc.

Network Node 111, 112, 130 Examples

In one example, the network node 111, 112, 130 configures the UE 120 with one SCell that has also a PUCCH active, so that the SCell may be used to send the PCell RLF message.

In one example, the network node 111, 112, 130 configures SRB1 to be CA duplicated on both the PCell and one of the SCells, i.e. two RLCs, one associated with the PCell and another with the SCell, based on the application/service that the UE 120 is currently using or expected to use in the future, e.g. URLLC.

In one sub example of the previous example, the network such as the network node 111, 112, 130 configures CA duplication for the SRB1 but is sets it to be inactive at the beginning, i.e. SRB1 data sent only via the RLC associated with the PCell and no data pushed to the other RLC, and it configures the UE 120 to activate it only when the PCell RLF is experienced. Such a "just in case" SRB duplication may be employed for other purposes as well, e.g. the network, such as the network node 111, 112, 130 may configure the UE 120 to activate the duplication or just the usage of the SCell path if the is measurement on the PCell falls below a certain threshold. In all the previous examples, the decision to configure the UE 120 in such a way, i.e. PUCCH active on an SCell or/and CA level duplicated SRB1 and/or "just in case" CA level duplicated SRB1 that becomes active on certain conditions, may be based on the type of the application and/or service that the UE 120 is currently using or expected to use in the future, e.g. URLLC.

In one example, the network node 111, 112, 130 performs radio link detection and/or monitoring on the PCell. For instance, the network node 111, 112, 130 assumes that the PCell has failed or is about to fail if it detects that the SRS signal quality and/or strength becomes much lower than a certain expected threshold, (N)ACKs anticipated from the UE 120 are not received on time, etc. Yet, in another example, the network node 111, 112, 130 performs radio link detection and/or monitoring by counting the not received RLC re-transmission after triggering each re-transmission by sending an RLC status report.

In another example, the failure counting on a single carrier is per RLC packet. That is, several failure counters may be initiated whenever an RLC packet is sent over a given carrier and incremented each time there is a failure. If the RLC packet is successfully sent, the failure count for that counter associated with the carrier and the concerned RLC packet is removed.

In one example, upon detecting radio link failure over the PCell, the network node 111, 112, 130 may immediately deactivate the PCell, flush the HARQ entity associated with the PCell, if duplication is active, and make SCell as the new PCell, but adding eventually a new SCell. In this case, radio link monitoring is started on the new PCell, i.e., former SCell.

Yet, in another example, upon detecting radio link failure on the PCell, the network node 111, 112, 130 may deactivate CA duplication, flush the HARQ entity associated with the PCell and continue normal transmissions over the SCell.

In one of the examples, upon receiving the PCell-RLF, the network node 111, 112, 130 sends a RRC connection re-configuration message to the UE 120 to communicate the new radio configuration, which may include the configuration of a new PCell. This may be either the SCell that was used to receive the PCell RLF, another SCell the UE 120 was already using, or a new SCell that is to be added. After detecting the failure, the network node 111, 112, 130 may also de-configures or deactivates CA duplication for the UE 120 by RRC signaling or MAC CE for duplication deactivation. Thus, the network node 111, 112, 130 may de-configure the RLC logical channel and/or the radio bearer associated with the failed PCell. The network may also set up and/or keep the CA duplication, but this time between the new PCell and one of the SCells.

In another example, upon detecting RLF on the PCell, the network node 111, 112, 130 may immediately deactivate the PCell and flush the HARQ entity associated with the PCell only if duplication is or was active.

In one example, if DC is enabled, i.e., there is an MN and secondary node, upon the reception of the SCGFailureInformation, the MN triggers a secondary node change and/or modification procedure. Yet, in another example, upon the reception of the SCGFailureInformation, the MN forwards it with an inter-node message to the SN that may take the necessary action, e.g., PSCell change.

In another example, the SN may directly receive a new report from the UE 120, e.g. PSCell RLF, either via SRB3 or embedded with SRB1, and forwarded towards the SN via X2/Xn. The SN, on reception of this information, may perform an SN modification procedure, e.g. change of PSCell. This may be based on the measurement information included in the PSCell RLF. Similar operations may be performed by the SN as in the MN for the case of the PCell RLF (i.e. deactivation of the CA level duplication, keeping the CA level duplication but this time with the new PSCell and another SCell, etc.

Figure 7:
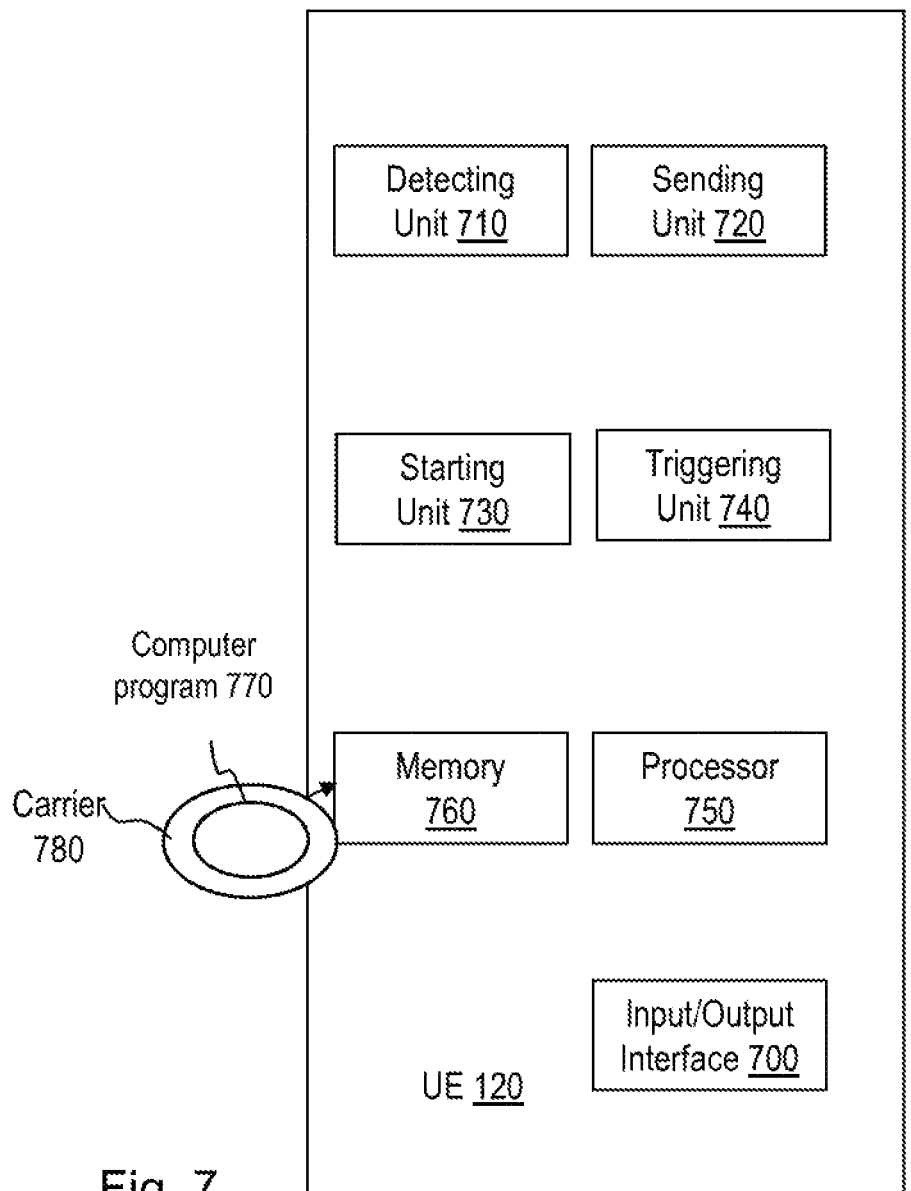
FIG. 7 is schematic block diagram illustrating embodiments of a UE.
Figure 8:
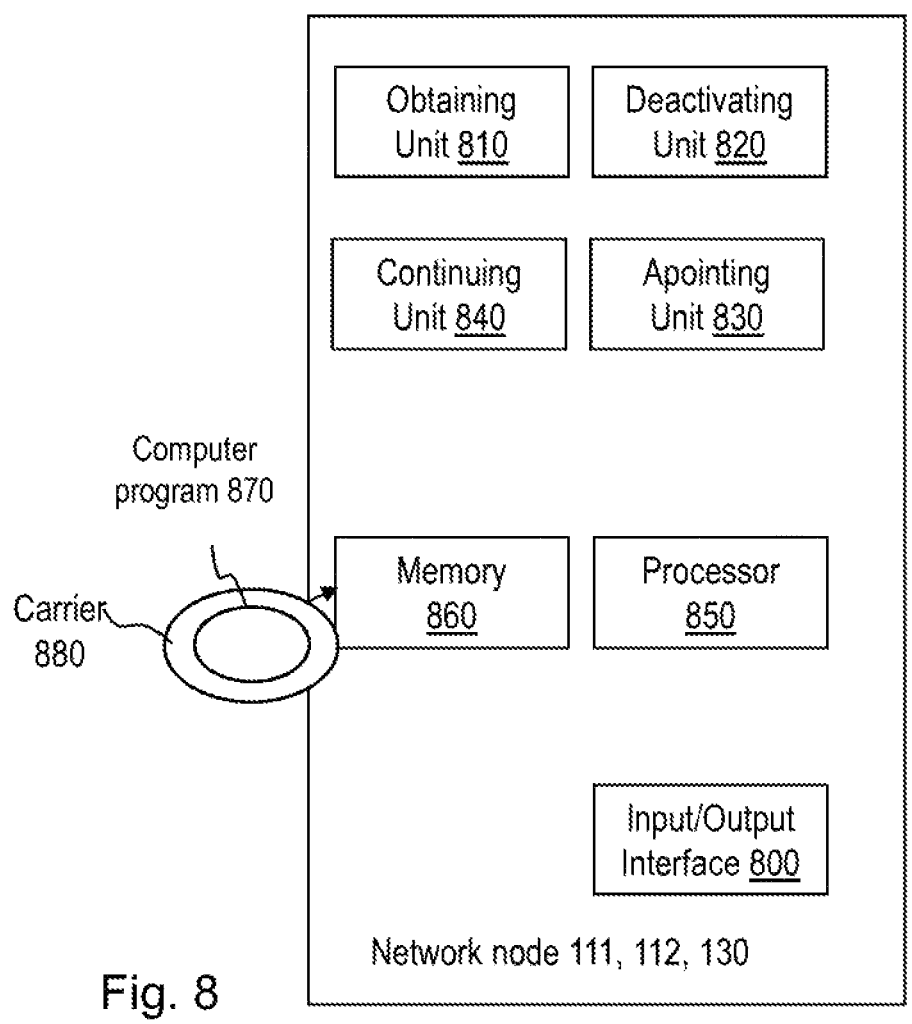
FIG. 8 is a schematic block diagram illustrating embodiments of network node.

FIG. 7 shows an example of the UE 120 and FIG. 8 shows an example of the network node 111, 112, 130.

The network node 111, 112, 130 and the UE 120 may comprise a respective input and output interface 700, 800 configured to communicate with each other, see FIGS. 7 and 8. The respective input and output interface 700, 800 may comprise a wireless receiver (not shown) and a wireless transmitter (not shown).

To perform the method actions as mentioned above, the UE 120 may comprise a detecting unit 710, a sending unit 720, a starting unit 730 and a triggering unit 740 as shown in FIG. 7.

To perform the method actions as mentioned above, the, network node 112, 112, 130 may comprise an obtaining unit 810, a deactivating unit 820, an appointing unit 830, and a continuing unit 840 as, shown in FIG. 8.

The embodiments herein may be implemented through a respective processor or one or more processors, such as the processor 850 of a processing circuitry in the network node 111, 112, 130 and processor 750 of a processing circuitry in the the UE 120 depicted in FIGS. 7 and 8 together with computer program code for performing the functions and actions of the embodiments herein The program code mentioned above may also be provided as a computer program product, for instance in the form of a data carrier carrying computer program code for performing the embodiments herein when being loaded into the network node 111, 112, 130 and the UE 120. One such carrier may be in the form of a CD ROM disc it is however feasible with other data carriers such as a memory stick. The computer program code may furthermore be provided as pure program code on a server and downloaded to the network node 111, 112, 130 and the UE 120.

The network node 111, 112, 130 and the UE 120 may further comprise respective a memory 860, 760 comprising one or more memory units. The memory comprises instructions executable by the processor in the network node 111, 112, and the UE 120.

The memory is arranged to be used to store e.g. information, data, configurations, and applications to perform the methods herein when being executed in the network node 111, 112, 130 and the UE 120.

In some embodiments, a respective computer program 870, 770 comprises instructions, which when executed by the at least one processor, cause the at least one processor of the network node 111, 112, 130 and the UE 120 to perform the actions above.

In some embodiments, a respective carrier 880 780 comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the network node 111, 112, 130 and the UE 120, described above may refer to a combination of analog and digital circuits, and//or one or more processors configured with software and/or firmware, e,g, stored in the network node 111, 112, 130 and the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-32 are described below. The following embodiments refer among other things to FIG. 5, FIG. 6, FIG. 7 and FIG. 8.

Embodiment 1

A method performed by a User Equipment, UE, 120 for handling a Radio Link Failure, RLF, on a first group of cells 115 in a wireless communication network 100, which UE 120 is engaged in an ongoing communication with the wireless communication network 100 via a first group of cells 115 and a second group of cells 116, the method comprising:

detecting 501 that an RLF or e.g. an indication of RLF, is on one or more out of the first group of cells 115, sending 502 a report to a network node 111, 112, 130 in the wireless communication network 100 via one or more out of the second group of cells 116 while continuing the communication with the wireless communication network 100, which report comprises radio link information about the RLF on one or more out of the first group of cells 115. The report may e.g. indicate to the network node 110 that connectivity is not available anymore.

Embodiment 2

The method according to embodiment 1, wherein any one or more out of:

the first group of cells comprises one or more Primary cells PCells.

the second group of cells comprises one or more Secondary cells SCells.

Embodiment 3

The method according to any of the embodiments 1-2, further comprising:

which report indicates to the second network node 112 to handle the RLF on one or more out of the first group of cells 115 while continuing the communication with the wireless communication network 100.

Embodiment 4

The method according to any of the embodiments 1-3, wherein the report is represented by a PCell-RLF report.

Embodiment 5

The method according to any of the embodiments 1-4, wherein the communication is represented by a duplication according to any one out of:

Carrier Aggregation, CA, level duplication on New Radio, NR,

Dual Connectivity, DC, level duplication on NR.

E.g. In addition, the method may be applied also when duplication is not active and there is a flow control between the first group of cells such as one or more PCells, and a second group of cells such as one or more SCells. That means that the UE 120 transmits over one of those and flow is switched between one of them by the network.

Embodiment 6

The method according to any of the embodiments 1-5, comprises that the RLF is on one or more out of the first group of cells e.g. one or more out of the PCells 115 is detected when any one or more out of:

when detecting that a maximum number of Radio Link Control, RLC, re-transmissions is reached, when a measured Reference Signal Received Power, RSRP, is below a threshold such as a certain limit, when the UE 120 fails to decode a Physical Downlink Control Channel PDCCH due to power signal quality.

when the UE 120 fails to decode a Physical Downlink Shared Channel PDSCH due to power signal quality, and when a counted number of failures that resulted from using a carrier is above a threshold, wherein the UE 120 employing CA keeps tracks of the association of an RLC entity and the carrier to which the RLC packets from that entity are being sent to, and it also counts the number of failures that resulted from using that carrier.

Embodiment 7

The method according to any of the embodiments 1-6, further comprising:

upon sending the report via one or more out of the second group of cells 116 starting 503 a timer, e.g. a waiting timer, for receiving an acknowledgement from the network node, 111, 112, 130, When the timer, expires e.g. of the waiting timer, triggering 504 a RLF procedure with consequent RRC connection re-establishment for the connection.

Embodiment 8

A computer program 770 comprising instructions, which when executed by a processor 750, cause the processor 750 to perform actions according to any of the embodiments 1-7.

Embodiment 9

A carrier 780 comprising the computer program of embodiment 8, wherein the carrier 780 is one of an electronic signal, an optical signal, an electromagnetic signal, a magnetic signal, an electric signal, a radio signal, a microwave signal, or a computer-readable storage medium.

Embodiment 10

A method performed by a network node 111, 112, 130 for handling a Radio Link Failure, RLF, on a first group of cells 115 in a wireless communication network 100, wherein a User Equipment, UE 120 is engaged in an ongoing communication with the wireless communication network 100 via a first group of cells 115 and a second group of cells, the method comprising:

obtaining 601 information about RLF on one or more out of the first group of cells 115, deactivating 602 any one out of: the one or more out of the first group of cells 115 and the duplication, such as e.g. the CA duplication for the UE 120, while continuing 603 the ongoing communication the UE 120 is engaged in.

Embodiment 11

The method according to embodiment 10, wherein the information about RLF on the PCell 115 is obtained via any one out of:

received in a report from the UE 120 via one or more out of the second group of cells 116, which report comprises radio link information about the RLF on the one or more out of the first group of cells 115, and detected by the network node 111, 112, 130 via monitoring the one or more out of the first group of cells 115.

Embodiment 12

The method according to any of the embodiments 10-11, wherein the report is represented by a PCell-RLF report.

Embodiment 13

The method according to any of the embodiments 10-12, wherein the ongoing communication the UE 120 is engaged in is continued via the one or more out of the second group of cells 116.

Embodiment 14

The method according to any of the embodiments 10-13, wherein the communication is represented by any one out of:

Carrier Aggregation, CA level duplication on New Radio, NR, and

Dual Connectivity, DC, level duplication on NR.

Embodiment 15

The method according to any of the embodiments 10-14 wherein one or more out of the second group of cell 116 is deactivated, appointing 604 one or more out of the second group of cells 116 as a new first group of cells 115.

Embodiment 16

The method according to any of the embodiments 10-15, wherein any one or more out of:

the first group of cells comprises one or more Primary cells PCells.

the second group of cells comprises one or more Secondary cells SCells,

Embodiment 17

A computer program 870 comprising instructions, which when executed by a processor 850, cause the processor 850 to perform actions according to any of the embodiments 10-16.

Embodiment 18

A carrier comprising the computer program of embodiment 17, wherein the carrier is one of an electronic signal, an optical signal, an electromagnetic signal, a magnetic signal, an electric signal, a radio signal, a microwave signal, or computer-readable storage medium.

Embodiment 19

A User Equipment, UE, 120 for handling a Radio Link Failure, RLF, on a first group of cells 115 in a wireless communication network 100, which UE 120 is adapted to be engaged in an ongoing communication with the wireless communication network 100 via a first group of cells 115 and a second group of cells 116, the UE 120 being configured to:

detect that an RLF or e.g. an indication of RLF, is on one or more out of the first group of cells 115, e.g. by means of a detecting unit 710 in the UE 120 send, e.g. by means of a sending unit 720 in the UE 120, a report to a network node 111, 112, 130 in the wireless communication network 100 via one or more out of the second group of cells 116 while continuing the communication with the wireless communication network 100, which report comprises radio link information about the RLF on one or more out of the first group of cells 115. The report e.g. indicate to the network node 110 that connectivity is not available anymore.

Embodiment 20

The UE 120 according to embodiment 19, wherein any one or more out of:
the first group of cells is adapted to comprise one or more Primary cells PCells.
the second group of cells is adapted to comprise one or more Secondary cells SCells.

Embodiment 21

The UE 120 according to any of the embodiments 19-20, further comprising:
which report is adapted to indicate to the second network node 112 to handle the RLF on one or more out of the first group of cells 115 while continuing the communication with the wireless communication network 100.

Embodiment 22

The UE 120 according to any of the embodiments 19-21, wherein the report is adapted to be represented by a PCell-RLF report.

Embodiment 23

The UE 120 according to any of the embodiments 19-22, wherein the communication is adapted to be represented by a duplication according to any one out of:
Carrier Aggregation, CA, level duplication on New Radio, NR,
Dual Connectivity, DC, level duplication on NR.
E.g. In addition, the method may be, applied also when duplication is not active and there is a flow control between the first group of cells such as one or more PCells, and a second group of cells such as one or more SCells. That means that the UE 120 transmits over one of those and flow is switched between one of them by the network.

Embodiment 24

The UE 120 according to any of the embodiments 19-23, wherein the RLF is on one or more out of the first group of cells e.g. on one or more out of the PCells 115 is detected when any one or more out of:
when detecting that a maximum number of Radio Link Control, RLC, re-transmissions is reached.
when a measured Reference Signal Received Power, RSRP, is below a threshold such as a certain limit,
when the UE 120 fails to decode a Physical Downlink Control Channel PDCCH due to power signal quality,
when the UE 120 fails to decode a Physical Downlink Shared Channel PDSCH due to power signal quality, and
when a counted number of failures that resulted from using a carrier is above a threshold, wherein the UE 120 employing CA keeps tracks of the association of an RLC entity and the carrier to which the RLC packets from that entity are being sent to, and it also counts the number of failures that resulted from using that carrier

Embodiment 25

The UE 120 according to any of the embodiments 19-24, further being configured to:
upon sending the report via one or more out of the second group of cells 116 start a timer, e.g. a waiting timer, for receiving an acknowledgement from the network node, 111, 112, 130, e.g. by means of a starting unit 730 in the UE 120,
When the timer expires of the waiting timer, trigger a RLF procedure with consequent RRC connection re-establishment tor the connection, e.g. by means of a triggering unit 740 in the UE 120.

An embodiment of the UE 120 according to any of the embodiments 19-25, wherein the UE 120 further is configured to:
upon the RLF detection, start Radio Link Monitoring, RLM, on at least one of the SCell(s).

An embodiment according to embodiments 28, wherein the UE 120 further is configured start of the RLM on any one out of: The SCell(s) with the highest signal strength or quality, or the SCell(s) on the lowest carder frequency, or the SCell(s) configured for RLM by the network.

Embodiment 26

A network node 111, 112, 130 for handling a Radio Link Failure, RLF, on a first group of cells 115 in a wireless communication network 100, wherein a User Equipment, UE 120 is adapted to be engaged in an ongoing communication with the wireless communication network 100 via a first group of cells 115 and a second group of cells, the network node 111, 112, 130 being configured to:
obtain information about RLF on one or more out of the first group of cells 115, e,g, by means of an obtaining unit 810 in the network node 111, 112, 130,
deactivate any one out of: the one or more out of the first group of cells 115 e.g. by means of a deactivating unit 820 in the network node 111, 112, 130, and e.g. the duplication, such as e.g. the CA duplication for the UE 120, while continuing the ongoing communication the UE 120 is engaged in e.g. by means of an continuing unit 840 in the network node 111, 112, 130.

Embodiment 27

The network node 111, 112, 130 according to embodiment 26, wherein the information about RLF on one or more out of the first group of cells 115 is adapted to be obtained via any one out of:
received in a report from the UE 120 via one or more out of the second group of cells 116, which report comprises radio link information about the RLF on the one or more out of the first group of cells 115, and
detected by the network node 111, 112, 130 via monitoring the one or more out of the first group of cells 115.

Embodiment 28

The network node 111, 112, 130 according to any of the embodiments 26-27, wherein the report is adapted to be represented by a Cell-RLF report.

Embodiment 29

The network node 111, 112, 130 according to any of the embodiments 26-28, wherein the ongoing communication the UE 120 is adapted to be engaged in is arranged to be continued via the one or more out of the second group of cells 116.

Embodiment 30

The network node 111, 112, 130 according to any of the embodiments 26-29, wherein the communication is adapted to be represented by any one out of:

Carrier Aggregation, CA, level duplication on New Radio, NR, and

Dual Connectivity, DC, level duplication on NR.

Embodiment 31

The network node 111, 112, 130 according to any of the embodiments 26-30, wherein one or more out of the second group of cells 116 is adapted to be deactivated, the network node 111, 112, 130 further is configured to, e.g by, means of an appointing unit 830 in the network node 111, 112, 130:

appoint one or more out of the second group of cells 116 as anew first group of cells 115.

Embodiment 32

Figure 9:
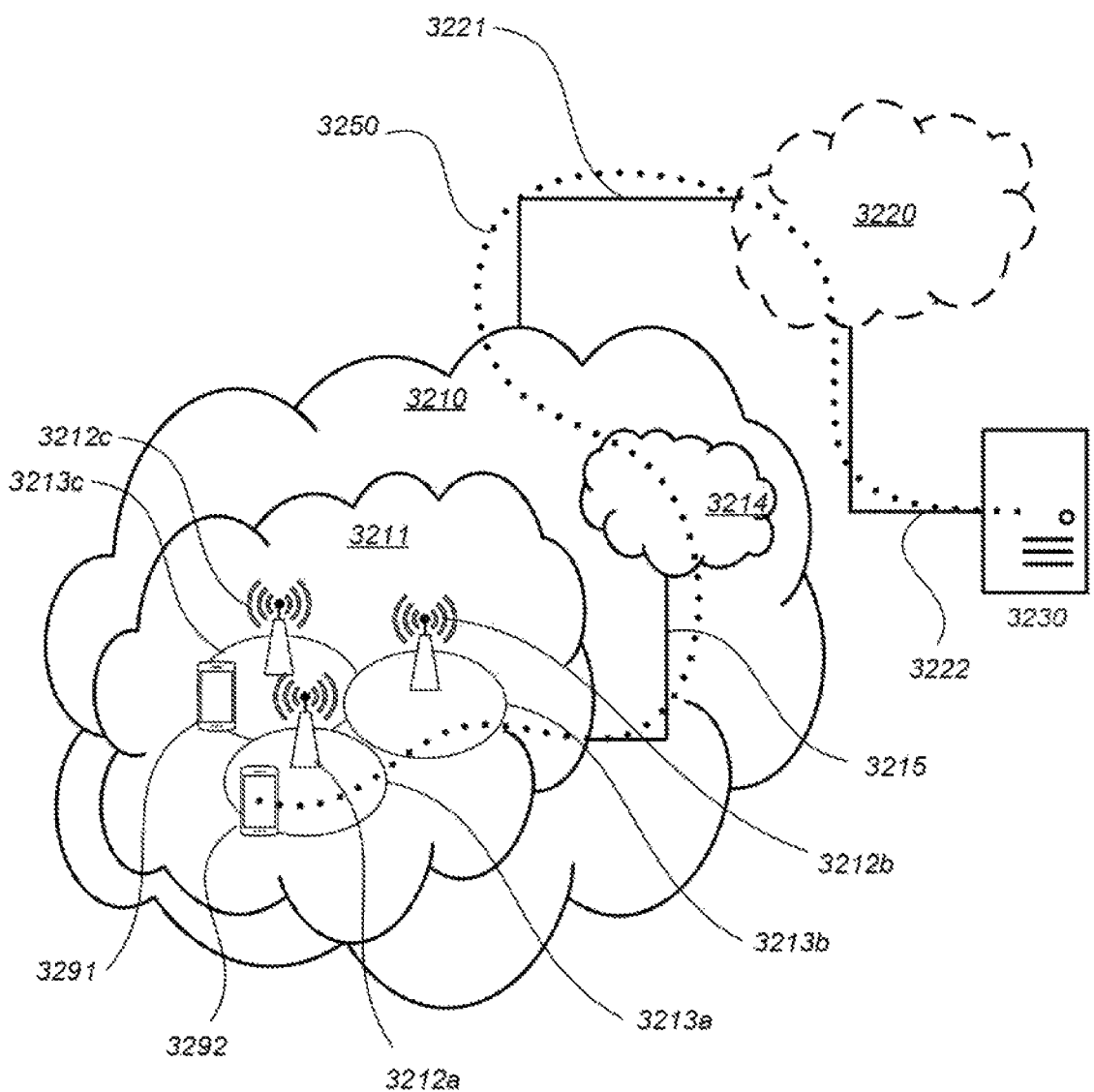
FIG. 9 schematically illustrates a telecommunication network connected via an intermediate network to a host computer.

The network node 111, 112, 130 according to any of the embodiments 26-31, wherein any one or more out of:

the first group of cells is adapted to comprise one or more Primary cells PCells.

the second group of cells is adapted to comprise one or more Secondary cells SCells, With reference to FIG. 9, in accordance with an embodiment, a communication system includes a telecommunication network 3210, such as a 3GPP-type cellular network, which comprises an access network 3211 such as a radio access network, and a core network 3214. The access network 3211 comprises a plurality of base stations 3212*a*, 3212*b*, 3212*c*, such as the first and second network node 111, 112, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as the UE 120, e.g. a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UE 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network, the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 such as e.g. the UE 120, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g. handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331. which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310, in the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data The client application 3332 may interact with the user to generate the user data that it provides.

Figure 10:
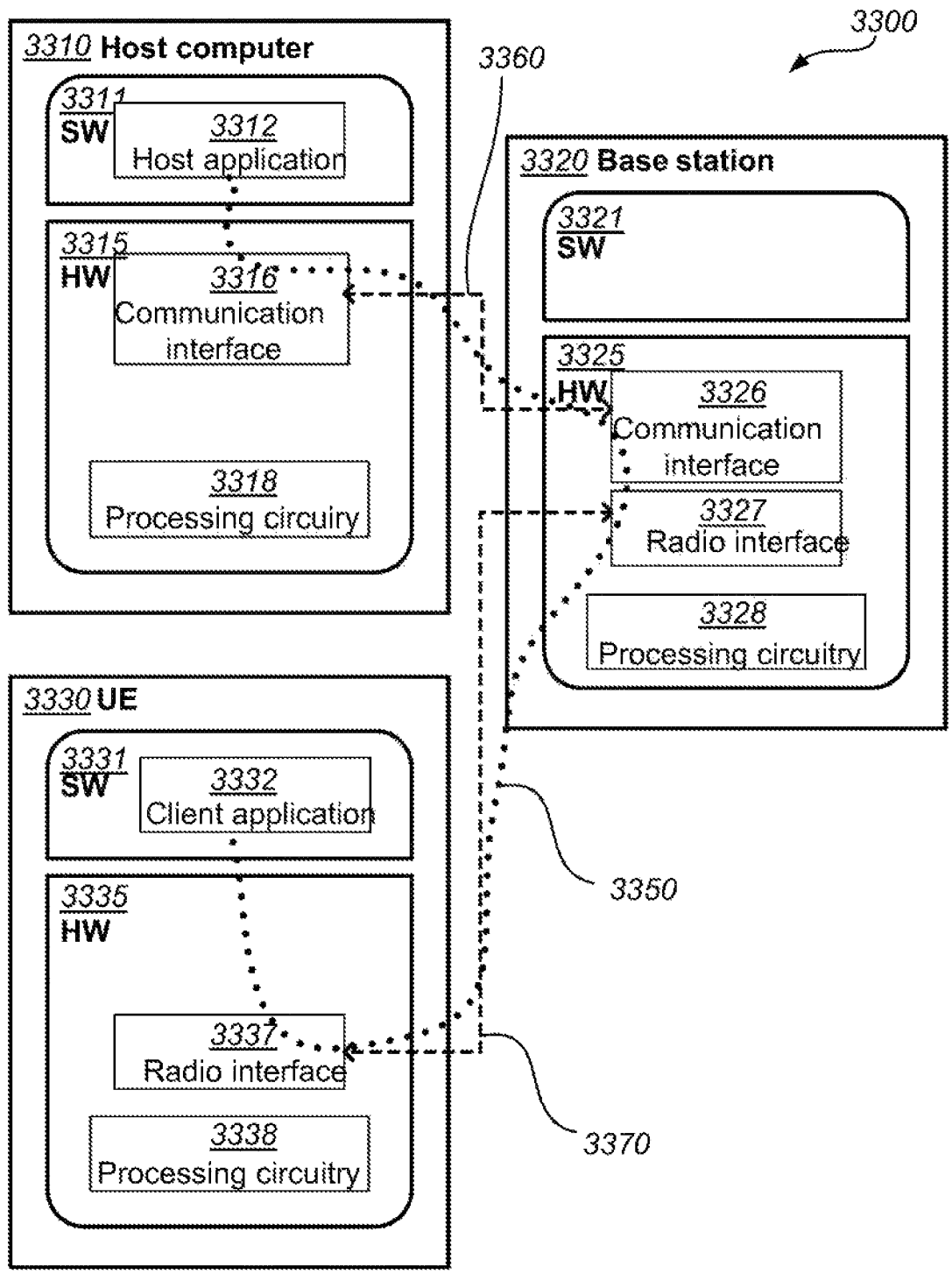
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT, connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of bad balancing consideration or reconfiguration of the network).

The wireless connection 3370 between the UE 3330 and the base station 3320 is in accordance with the teachings, of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both, in embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, Propagation times, latency and the like. The measurements may be implemented in that the software 3311. 3331 causes messages to be transmitted, in particular empty or 'dummy' messages, using the OTT connection 3350 while it monitors propagation times, errors etc.

Figures 11, 12:
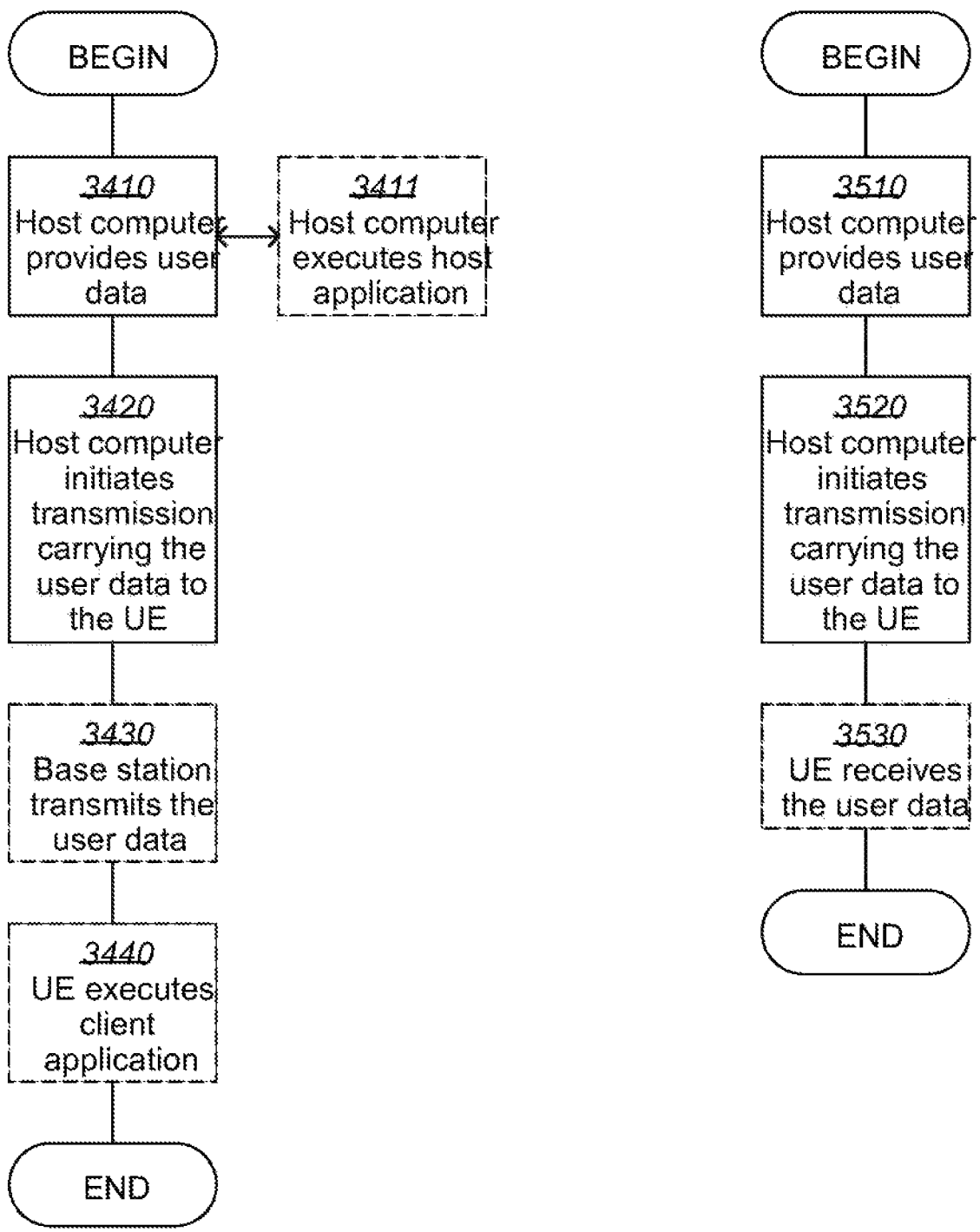

FIG. 11 is a flowchart illustrating a method implemented in a communication 20 system, in accordance with one embodiment. The communication system includes a host computer, a base station such as a AP STA, and a UE such as a Non-AP STA which may be those described with reference to FIG. 9 and FIG. 10 For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10 For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 13 is a flowchart illustrating a method implemented in a communication system, in accordance with one embodiment The communication system includes a host computer, a base station such as a AP STA, and a UE such as a Non-AP STA which may be those described with reference to FIG. 9 and FIG. 10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user date was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise or " "comprising" it shall be interpreted as non-limiting, i.e. meaning "consist at least of".

The embodiments herein are not limited to the above described preferred embodiments. Various alternatives modifications and equivalents may be used.

ABBREVIATIONS

Abbreviation Explanation
Abbreviation Explanation
ACK Acknowledgement
AP Application Protocol
BSR Buffer Status Report
CA Carrier Aggregation
CE Control Element
CP Control Plane
DC Dual Connectivity
DCI Downlink Control Information
DL Downlink
DRB Data Radio Bearer
eNB (EUTRAN) base station
E-RAB EUTRAN Radio Access Bearer
FDD Frequency Division Duplex
gNB NR base station
GTP-U CPRS Tunneling Protocol—User Plane
IP Internet Protocol
LTE Long Term Evolution
MCG Master Cell Group
MAC Medium Access Control
MeNB Master eNB
MgNB Master gNB
MN Master Node
NACK Negative Acknowledgement
NR New Radio
PDCP Packet Data Convergence Protocol
PCell Primary Cell
PSCell Primary SCell
PUSCH Physical Uplink Shared Channel
RLC Radio Link Control
RLF Radio Link Failure
RRC Radio Resource Control
SCell Secondary Cell
SCG Secondary Cell Group
SCTP Stream Control Transmission Protocol
SeNB Secondary eNB
SN Secondary Node
SR Scheduling Request
SRB Signaling Radio Bearer
TDD Time Division Duplex
TEID Tunnel Endpoint IDentifier
TNL Transport Network Layer
UCI Uplink Control Information
UDP User Datagram Protocol
UE User Equipment
UL Uplink
UP User Plane
URLCC Ultra Reliable Low Latency Communication
X2 Interface between base stations

The invention claimed is:

1. A method performed by a User Equipment, UE, for handling a Radio Link Failure, RLF, on a first group of cells in a wireless communication network, which UE is engaged in an ongoing communication with the wireless communication network via a first group of cells and a second group of cells, the method comprising:
   detecting that an RLF is on one or more out of the first group of cells,
   upon detection of the RLF, sending a report to a network node in the wireless communication network via one or more out of the second group of cells while continuing the communication with the wireless communication network, via one or more out of the second group of cells which report comprises radio link information about the RLF on one or more out of the first group of cells, wherein the first group of cells comprises one or more Primary cells, PCells, and the second group of cells comprises one or more Secondary cells, SCells, and wherein the report indicates to a second network node to handle the RLF on one or more out of the first group of cells while continuing the communication with the wireless communication network, and
   wherein duplication of packets is applicable to the ongoing communication at either dual connectivity, DC, level or carrier aggregation, CA, level in New Radio, NR.

2. The method according to claim 1, wherein the report is represented by a PCell-RLF report.

3. The method according to claim 1, wherein the RLF on one or more out of the first group of cells, is detected when any one or more out of:
   when detecting that a maximum number of Radio Link Control, RLC, re-transmissions is reached,
   when a measured Reference Signal Received Power, RSRP, is below a threshold,
   when the UE fails to decode a Physical Downlink Control Channel, PDCCH, due to power signal quality,
   when the UE fails to decode a Physical Downlink Shared Channel, PDSCH, due to power signal quality, and
   when a counted number of failures that resulted from using a carrier is above a threshold, wherein the UE employing CA keeps tracks of the association of an RLC entity and the carrier to which the RLC packets from that entity are being sent to, and it also counts the number of failures that resulted from using that carrier.

4. The method according to claim 1, further comprising:
upon sending the report via one or more out of the second group of cells starting a timer for receiving an acknowledgement from the network node, and
when the timer expires, triggering an RLF procedure with consequent RRC connection re-establishment for the communication.

5. The method according to claim 1, further comprising:
upon the RLF detection, starting Radio Link Monitoring, RLM, on at least one of the SCell(s).

6. The method according to claim 5, wherein starting of the RLM is performed on any one out of:
the SCell(s) with the highest signal strength or quality, or the SCell(s) on the lowest carrier frequency, or the SCell(s) configured for RLM by the network.

7. A computer program comprising instructions, which when executed by a processor, cause the processor to perform actions according to claim 1.

8. A carrier comprising the computer program of claim 7, wherein the carrier is one of an electronic signal, an optical signal, an electromagnetic signal, a magnetic signal, an electric signal, a radio signal, a microwave signal, or a computer-readable storage medium.

9. A method performed by a network node for handling a Radio Link Failure, RLF, on a first group of cells in a wireless communication network, wherein a User Equipment, UE is engaged in an ongoing communication with the wireless communication network via a first group of cells and a second group of cells, the method comprising:
obtaining information about RLF on one or more out of the first group of cells, wherein the information is obtained by being received in a report from the UE via one or more out of the second group of cells, which report comprises radio link information about the RLF on the one or more out of the first group of cells,
upon obtaining information about the RLF, deactivating any one out of: the one or more out of the first group of cells and the duplication, for the UE, while continuing the ongoing communication the UE is engaged in, via one or more out of the second group of cells, wherein the first group of cells comprises one or more Primary cells, PCells, and the second group of cells comprises one or more Secondary cells, SCells, and wherein the report indicates to a second network node to handle the RLF on one or more out of the first group of cells while continuing the communication with the wireless communication network, and
wherein duplication of packets is applicable to the ongoing communication at either dual connectivity, DC, level or carrier aggregation, CA, level in New Radio, NR.

10. A User Equipment, UE, for handling a Radio Link Failure, RLF, on a first group of cells in a wireless communication network, which UE is adapted to be engaged in an ongoing communication with the wireless communication network via a first group of cells and a second group of cells, the UE comprising:
processing circuitry configured to:
detect that an RLF is on one or more out of the first group of cells,
upon detection of the RLF, send a report to a network node in the wireless communication network via one or more out of the second group of cells while continuing the communication with the wireless communication network, via one or more out of the second group of cells, which report comprises radio link information about the RLF on one or more out of the first group of cell, wherein the first group of cells comprises one or more Primary cells, PCells, and the second group of cells comprises one or more Secondary cells, SCells, and wherein the report indicates to a second network node to handle the RLF on one or more out of the first group of cells while continuing the communication with the wireless communication network, and
wherein duplication of packets is applicable to the ongoing communication at either dual connectivity, DC, level or carrier aggregation, CA, level in New Radio, N s.

11. The UE according to claim 10, wherein the report is adapted to be represented by a PCell-RLF report.

12. The UE according to claim 10 wherein the RLF is on one or more out of the first group of cells is detected when any one or more out of:
when detecting that a maximum number of Radio Link Control, RLC, re-transmissions is reached,
when a measured Reference Signal Received Power, RSRP, is below a threshold such as a certain limit,
when the UE fails to decode a Physical Downlink Control Channel PDCCH due to power signal quality,
when the UE fails to decode a Physical Downlink Shared Channel PDSCH due to power signal quality, and
when a counted number of failures that resulted from using a carrier is above a threshold, wherein the UE employing CA keeps tracks of the association of an RLC entity and the carrier to which the RLC packets from that entity are being sent to, and it also counts the number of failures that resulted from using that carrier.

13. The UE according to claim 10, further being configured to:
upon sending the report via one or more out of the second group of cells start a timer, for receiving an acknowledgement from the network node,
when the timer expires of the waiting timer, trigger a RLF procedure with consequent RRC connection re-establishment for the connection.

14. The UE according to claim 10, further being configured to:
upon the RLF detection, start Radio Link Monitoring, RLM, on at least one of the SCell(s).

15. The UE according to claim 14, further being configured to start of the RLM on any one out of:
the SCell(s) with the highest signal strength or quality, or the SCell(s) on the lowest carrier frequency, or the SCell(s) configured for RLM by the network.

16. A network node for handling a Radio Link Failure, RLF, on a first group of cells in a wireless communication network, wherein a User Equipment, UE is adapted to be engaged in an ongoing communication with the wireless communication network via a first group of cells and a second group of cells, the network node comprising:
processing circuitry configured to:
obtain information about RLF on one or more out of the first group of cells, wherein the information is obtained by being received in a report from the UE via one or more out of the second group of cells, which report comprises radio link information about the RLF on the one or more out of the first group of cells,
upon obtaining information about the RLF, deactivate any one out of: the one or more out of the first group of cells, while continuing the ongoing communication the UE is engaged in, via one or more out of the second group of cells, wherein the first group of cells comprises one or more Primary cells, PCells, and the second group of cells comprises one or more Secondary cells, SCells, and wherein the report indicates to a second network node to handle the RLF on one or more out of the first group of cells while continuing the communication with the wireless communication network, and wherein duplication of packets is applicable to the ongoing communication at either dual connectivity, DC, level or carrier aggregation, CA, level in New Radio, NR.

wherein duplication of packets is applicable to the ongoing communication at either dual connectivity, DC, level or carrier aggregation, CA, level in New Radio, NR.

17. The network node according to claim 16, wherein the report is adapted to be represented by a PCell-RLF report.

18. The network node according to claim 16, wherein one or more out of the second group of cells is adapted to be deactivated, the network node further is configured to:
apoint one or more out of the second group of cells as a new first group of cells.

* * * * *

UNITED STATES PATENT AND TRADEMARK OFFICE
CERTIFICATE OF CORRECTION

| | |
|---|---|
| PATENT NO. | : 10,959,279 B2 |
| APPLICATION NO. | : 16/461599 |
| DATED | : March 23, 2021 |
| INVENTOR(S) | : Orsino et al. |

It is certified that error appears in the above-identified patent and that said Letters Patent is hereby corrected as shown below:

On the Title Page

Item (57), under "ABSTRACT", in Column 2, Line 1, delete "handing" and insert -- handling --, therefor.

In the Drawings

In Fig. 5, Sheet 5 of 12, for Step "502.", in Lines 2-3, delete "in the via" and insert -- in the wireless communication network via --, therefor.

In the Specification

In Column 1, Line 10, delete "EQUIPMENT NETWORK" and insert -- EQUIPMENT, NETWORK --, therefor.

In Column 1, Lines 11-12, delete "NETWORK:" and insert -- NETWORK", --, therefor.

In Column 1, Line 20, delete "(RLF" and insert -- (RLF) --, therefor.

In Column 1, Lines 27-28, delete "stations (STA) and/or User Equipments (UE)," and insert -- stations (STAs) and/or User Equipments (UEs), --, therefor.

In Column 1, Line 52, delete "E-UTRANILTE" and insert -- E-UTRAN/LTE --, therefor.

In Column 1, Line 55, delete "the a" and insert -- the functions of a --, therefor.

In Column 1, Lines 56-57, delete "eNodeBs LTE," and insert -- eNodeBs in LTE, --, therefor.

In Column 2, Line 5, delete "in NR" and insert -- In NR --, therefor.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,959,279 B2

In Column 2, Line 6, delete "infrastructure and" and insert -- infrastructure, and --, therefor.

In Column 2, Line 12, delete "connected 5GC" and insert -- connected to a 5G --, therefor.

In Column 2, Line 16, delete "(SLAP)," and insert -- (SDAP), --, therefor.

In Column 2, Lines 17-18, delete "Radio link control (RLC) and Medium Access Control (MAC)," and insert -- Radio Link Control (RLC), Medium Access Control (MAC), --, therefor.

In Column 2, Line 23, delete "Non Access Stratum (NAS)," and insert -- Non-Access Stratum (NAS), --, therefor.

In Column 2, Line 32, delete "(P Cell)." and insert -- (PCell). --, therefor.

In Column 2, Line 54, delete "Secondary Component Carrier (SCC)s" and insert -- Secondary Component Carriers (SCCs) --, therefor.

In Column 2, Line 57, delete "only:" and insert -- only; --, therefor.

In Column 2, Line 59, delete "serving cell," and insert -- serving cell; --, therefor.

In Column 3, Line 4, delete "de-activated:" and insert -- de-activated; --, therefor.

In Column 3, Line 6, delete "radio" and insert -- Radio --, therefor.

In Column 3, Line 11, delete "Upon detecting," and insert -- upon detecting --, therefor.

In Column 3, Line 15, delete "iii. UI upon" and insert -- iii. upon --, therefor.

In Column 3, Lines 22-23, delete "goes o IDLE mode, select cell following LE" and insert -- goes to IDLE mode, selects a cell following IDLE --, therefor.

In Column 3, Line 25, delete "re-e n procedure," and insert -- re-establishment procedure, --, therefor.

In Column 3, Line 27, delete "on PCell," and insert -- on the PCell, --, therefor.

In Column 3, Line 28, delete "establishment" and insert -- re-establishment --, therefor.

In Column 3, Line 32, delete "in duplication" and insert -- introduce duplication --, therefor.

In Column 3, Line 38, delete "to carrier," and insert -- to as carrier, --, therefor.

In Column 3, Line 48, delete "there one" and insert -- there is one --, therefor.

In Column 3, Line 55, delete "herein to prove the" and insert -- herein is to improve the --, therefor.

CERTIFICATE OF CORRECTION (continued)
U.S. Pat. No. 10,959,279 B2

In Column 4, Line 6, delete "by, method" and insert -- by method --, therefor.

In Column 4, Line 26, delete "and," and insert -- and --, therefor.

In Column 4, Line 32, delete "first, group" and insert -- first group --, therefor.

In Column 4, Line 36, delete "Radio Link Failure. RLF," and insert -- Radio Link Failure, RLF, --, therefor.

In Column 4, Line 39, delete "communication cells" and insert -- communication network 100 via a first group of cells --, therefor.

In Column 4, Line 41, delete "one more" and insert -- one or more --, therefor.

In Column 4, Line 42, delete "cells and" and insert -- cells, and --, therefor.

In Column 4, Line 44, delete "the, ongoing" and insert -- the ongoing --, therefor.

Figure 2:
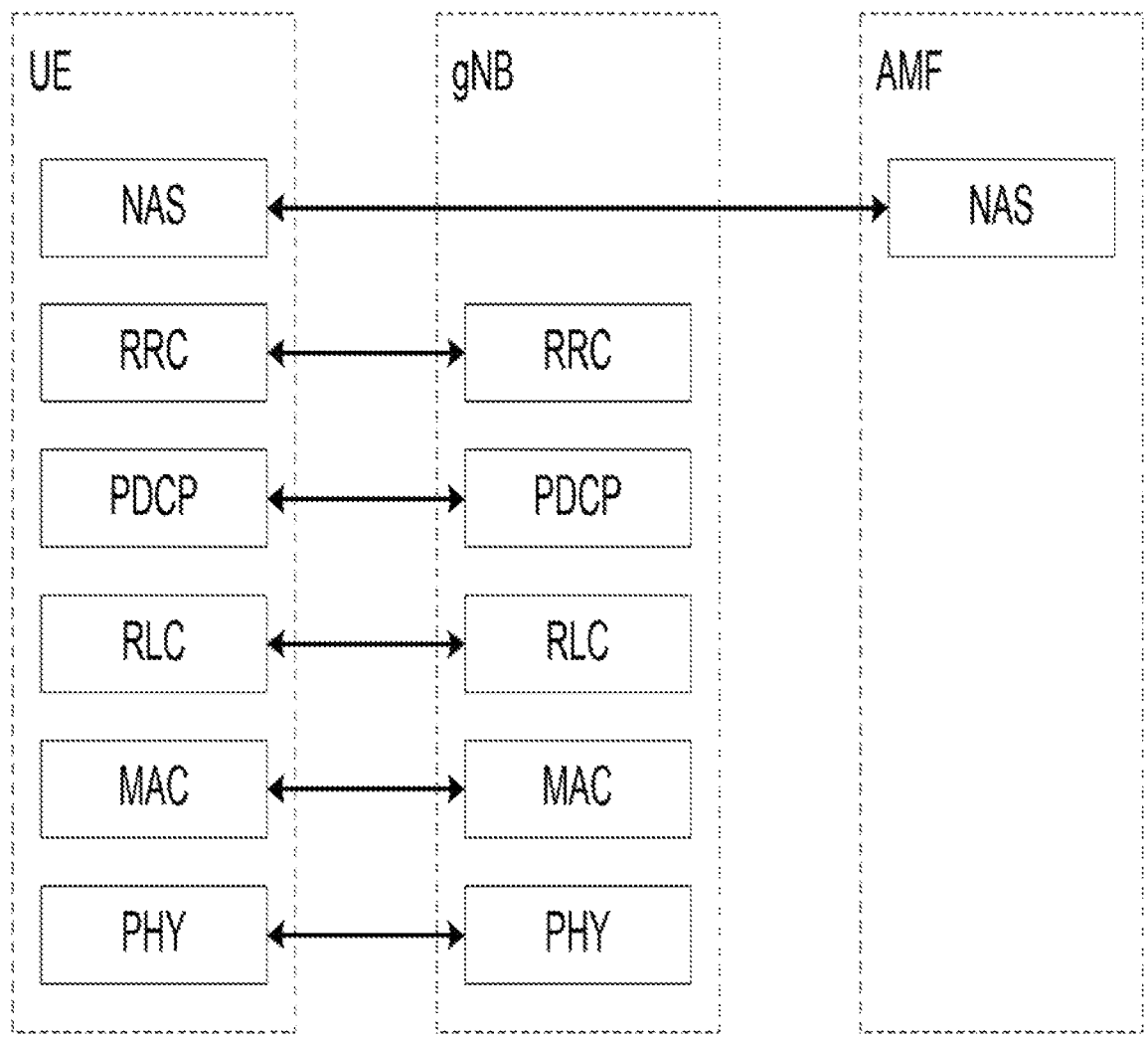
FIG. 2 schematic diagram illustrating prior art.
Figure 3:
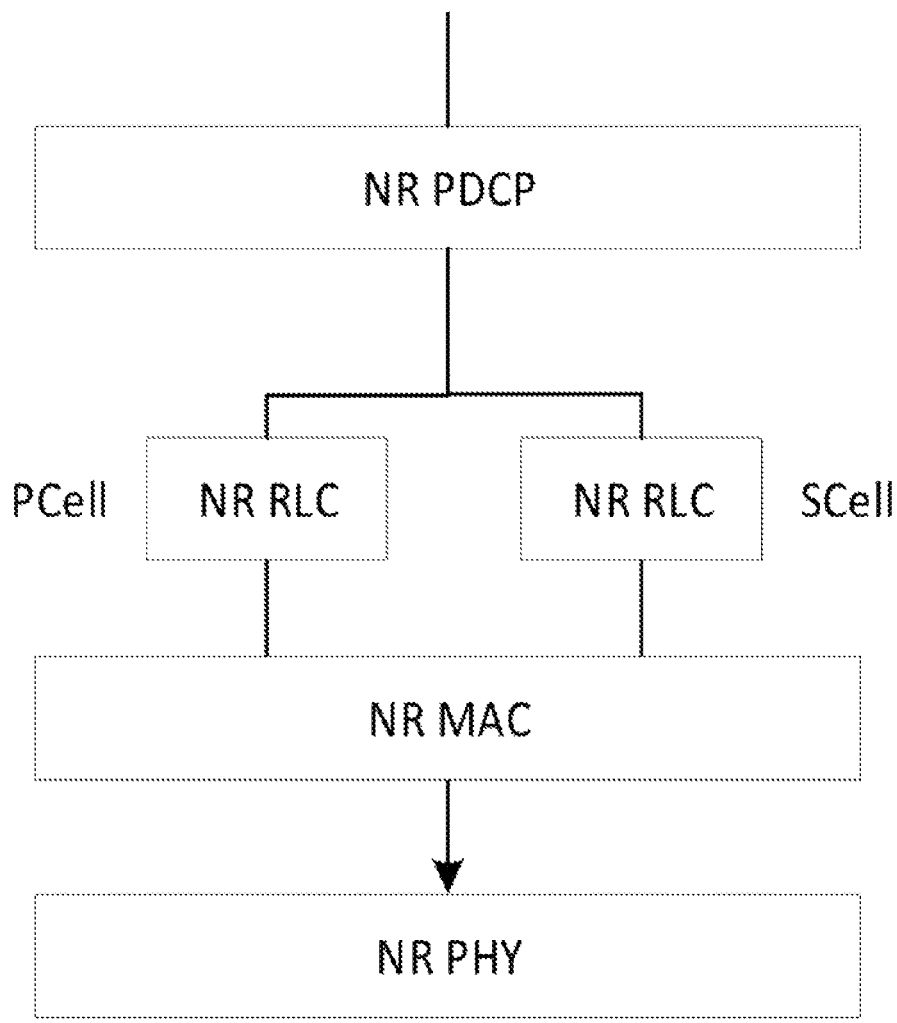
FIG. 3 is a schematic diagram illustrating prior art.

In Column 4, Line 50, delete "FIG. 2 schematic" and insert -- FIG. 2 is a schematic --, therefor.

In Column 4, Line 58, delete "is schematic" and insert -- is a schematic --, therefor.

In Column 4, Line 61, delete "of network" and insert -- of a network --, therefor.

In Column 5, Lines 2-3, delete "computer, base" and insert -- computer, a base --, therefor.

In Column 5, Line 13, delete "(CC)." and insert -- (CCs). --, therefor.

In Column 5, Line 16, delete "Primary Cell) supports" and insert -- Primary Cell (PCell) supports --, therefor.

In Column 5, Line 20, delete "Scheduling Requests (SR)" and insert -- Scheduling Requests (SRs) --, therefor.

In Column 5, Line 22, delete "the U E to" and insert -- the UE to --, therefor.

In Column 5, Line 33, delete "UTE" and insert -- UE --, therefor.

In Column 5, Line 36, delete "to a PUCCH" and insert -- to enable PUCCH --, therefor.

In Column 5, Line 48, delete "mare" and insert -- more --, therefor.

In Column 5, Line 63, delete "way" and insert -- way, --, therefor.

In Column 5, Line 67, delete "Handling Standalone" and insert -- Handling in Standalone --, therefor.

In Column 6, Line 11, delete "Long-Term Evolution (LTE)," and insert -- Long Term Evolution (LTE), --, therefor.

In Column 6, Line 12, delete "New Radio NR)," and insert -- New Radio (NR), --, therefor.

In Column 6, Line 13, delete "mobile" and insert -- Mobile --, therefor.

In Column 6, Line 28, delete "of first" and insert -- of a first --, therefor.

In Column 6, Line 33, delete "one of more" and insert -- one or more --, therefor.

In Column 6, Line 34, delete "of first" and insert -- of a first --, therefor.

In Column 6, Line 37, delete "e.g," and insert -- e.g., --, therefor.

In Column 6, Line 42, delete "agNB," and insert -- a gNB, --, therefor.

In Column 6, Line 47, delete "sewed" and insert -- served --, therefor.

In Column 6, Lines 49-50, delete "first and second network node 111, 112 network nodes may" and insert -- first and second network node 111, 112 may --, therefor.

In Column 6, Line 57, delete "terminals," and insert -- terminal, --, therefor.

In Column 6, Line 58, delete "(AN)," and insert -- (ANs), --, therefor.

In Column 6, Line 60, delete "(CN)" and insert -- (CNs) --, therefor.

In Column 7, Line 10, delete "e.g" and insert -- e.g., --, therefor.

In Column 7, Line 13, delete "carriers, e.g." and insert -- carriers, e.g., --, therefor.

In Column 7, Line 21, delete "UE is 120" and insert -- UE 120 --, therefor.

In Column 7, Lines 57-58, delete "606 Hz." and insert -- 60 GHz. --, therefor.

In Column 8, Line 22, delete "E.g. In" and insert -- E.g. in --, therefor.

In Column 8, Line 55, delete "network node,111, 112, 130." and insert -- network node 111, 112, 130. --, therefor.

In Column 8, Line 60, delete "one, or" and insert -- one or --, therefor.

In Column 8, Line 65, delete "E.g, the" and insert -- E.g., the --, therefor.

In Column 9, Line 4, delete "When" and insert -- when --, therefor.

CERTIFICATE OF CORRECTION (continued)
U.S. Pat. No. 10,959,279 B2

In Column 9, Line 7, delete "limits," and insert -- limit, --, therefor.

In Column 9, Line 45, delete "that e" and insert -- that the --, therefor.

In Column 9, Line 50, delete "report," and insert -- report. --, therefor.

In Column 9, Line 53, delete "116. The" and insert -- 116, the --, therefor.

In Column 10, Line 7, delete "first, group" and insert -- first group --, therefor.

In Column 10, Line 19, delete "actions." and insert -- actions: --, therefor.

In Column 10, Line 20, delete "Action 601" and insert -- Action 601, --, therefor.

In Column 10, Line 21, delete "RAF" and insert -- RLF --, therefor.

In Column 10, Line 25, delete "tor" and insert -- for --, therefor.

In Column 10, Line 42, delete "embodiments the" and insert -- embodiments, the --, therefor.

In Column 10, Line 44, delete "Received" and insert -- received --, therefor.

In Column 10, Line 63, delete "e.g," and insert -- e.g., --, therefor.

In Column 11, Line 32, delete "E-UTRA-NR." and insert -- E-UTRA-NR, --, therefor.

In Column 11, Lines 32-33, delete "NR-NR)." and insert -- (NR-NR). --, therefor.

In Column 11, Line 57, delete "e.g," and insert -- e.g., --, therefor.

In Column 11, Line 60, delete "e.g." and insert -- e.g., --, therefor.

In Column 11, Line 65, delete "counts" and insert -- count --, therefor.

In Column 12, Line 15, delete "network node111, 112 130," and insert -- network node 111, 112, 130, --, therefor.

In Column 12, Lines 26-27, delete "network node111, 112 130." and insert -- network node 111, 112, 130. --, therefor.

In Column 12, Line 30, delete "or similar" and insert -- or a similar --, therefor.

In Column 12, Line 36, delete "an recovery" and insert -- and recovery --, therefor.

In Column 12, Line 44, delete "e.g." and insert -- e.g., --, therefor.

CERTIFICATE OF CORRECTION (continued)
U.S. Pat. No. 10,959,279 B2

In Column 12, Line 65, delete "to, use" and insert -- to use --, therefor.

In Column 13, Line 2, delete "sanding" and insert -- sending --, therefor.

In Column 13, Line 14, delete "secondary Node (SN)." and insert -- Secondary Node (SN). --, therefor.

In Column 13, Line 47, delete "the is measurement" and insert -- the measurement --, therefor.

In Column 14, Line 64, delete "730 and" and insert -- 730, and --, therefor.

In Column 14, Lines 66-67, delete "the, network node 112, 112, 130" and insert -- the network node 111, 112, 130, --, therefor.

In Column 15, Line 2, delete "as, shown" and insert -- as shown --, therefor.

In Column 15, Line 7, delete "the the UE" and insert -- the UE --, therefor.

In Column 15, Line 9, delete "herein The" and insert -- herein. The --, therefor.

In Column 15, Line 15, delete "CD ROM" and insert -- CD-ROM --, therefor.

In Column 15, Line 15, delete "disc it" and insert -- disc. It --, therefor.

In Column 15, Line 21, delete "respective a memory" and insert -- respective memory --, therefor.

In Column 15, Line 34, delete "880 780" and insert -- 880, 780 --, therefor.

In Column 15, Line 43, delete "and//or" and insert -- and/or --, therefor.

In Column 15, Line 44, delete "e,g," and insert -- e.g., --, therefor.

In Column 15, Line 49, delete "Application-Specific Integrated Circuitry (ASIC)," and insert -- Application-Specific Integrated Circuit (ASIC), --, therefor.

In Column 16, Lines 14-15, delete "Primary cells PCells." and insert -- Primary cells, PCells, --, therefor.

In Column 16, Lines 16-17, delete "Secondary cells SCells." and insert -- Secondary cells, SCells. --, therefor.

In Column 16, Line 42, delete "E.g. In" and insert -- E.g. in --, therefor.

In Column 16, Lines 59-60, delete "Physical Downlink Control Channel PDCCH" and insert -- Physical Downlink Control Channel, PDCCH, --, therefor.

In Column 16, Line 60, delete "signal quality." and insert -- signal quality, --, therefor.

In Column 16, Lines 61-62, delete "Physical Downlink Shared Channel PDSCH" and insert -- Physical Downlink Shared Channel, PDSCH, --, therefor.

In Column 17, Line 12, delete "130," and insert -- 130. --, therefor.

In Column 17, Line 13, delete "timer, expires" and insert -- timer expires --, therefor.

In Column 18, Line 12, delete "of;" and insert -- of: --, therefor.

In Column 18, Line 13, delete "Carrier Aggregation, CA level" and insert -- Carrier Aggregation, CA, level --, therefor.

In Column 18, Line 20, delete "10-14" and insert -- 10-14, --, therefor.

In Column 18, Line 21, delete "cell 116" and insert -- cells 116 --, therefor.

In Column 18, Lines 30-31, delete "Primary cells PCells." and insert -- Primary cells, PCells, --, therefor.

In Column 18, Lines 32-33, delete "Secondary cells SCells," and insert -- Secondary cells, SCells. --, therefor.

In Column 18, Line 48, delete "or computer-readable" and insert -- or a computer-readable --, therefor.

In Column 18, Line 61, delete "UE 120" and insert -- UE 120. --, therefor.

In Column 19, Line 9, delete "Primary cells PCells." and insert -- Primary cells, PCells, --, therefor.

In Column 19, Line 11, delete "Secondary cells SCells." and insert -- Secondary cells, SCells. --, therefor.

In Column 19, Line 34, delete "E.g. In" and insert -- E.g. in --, therefor.

In Column 19, Line 34, delete "be, applied" and insert -- be applied --, therefor.

In Column 19, Line 47, delete "reached." and insert -- reached, --, therefor.

In Column 19, Lines 50-51, delete "Physical Downlink Control Channel PDCCH" and insert -- Physical Downlink Control Channel, PDCCH, --, therefor.

In Column 19, Lines 52-53, delete "Physical Downlink Shared Channel PDSCH" and insert -- Physical Downlink Shared Channel, PDSCH, --, therefor.

In Column 19, Line 61, delete "carrier" and insert -- carrier. --, therefor.

In Column 20, Line 1, delete "network node, 111," and insert -- network node 111, --, therefor.

In Column 20, Line 3, delete "When" and insert -- when --, therefor.

In Column 20, Line 5, delete "tor the" and insert -- for the --, therefor.

In Column 20, Line 14, delete "configured start" and insert -- configured to start --, therefor.

In Column 20, Line 16, delete "carder" and insert -- carrier --, therefor.

In Column 20, Line 29, delete "e,g," and insert -- e.g., --, therefor.

In Column 20, Line 36, delete "an continuing" and insert -- a continuing --, therefor.

In Column 20, Line 58, delete "a Cell-RLF" and insert -- a PCell-RLF --, therefor.

In Column 21, Line 15, delete "to, e.g by, means" and insert -- to, e.g. by means --, therefor.

In Column 21, Line 16, delete "130:" and insert -- 130, --, therefor.

In Column 21, Line 18, delete "anew" and insert -- a new --, therefor.

In Column 21, Line 26, delete "Primary cells PCells." and insert -- Primary cells, PCells, --, therefor.

In Column 21, Line 28, delete "Secondary cells SCells," and insert -- Secondary cells, SCells. --, therefor.

In Column 21, Line 32, delete "3211 such" and insert -- 3211, such --, therefor.

In Column 21, Line 46, delete "of UE" and insert -- of UEs --, therefor.

In Column 21, Line 64, delete "network," and insert -- network; --, therefor.

In Column 22, Line 17, delete "(e.g." and insert -- (e.g., --, therefor.

In Column 23, Line 14, delete "3331." and insert -- 3331, --, therefor.

In Column 23, Line 19, delete "3310, in" and insert -- 3310. In --, therefor.

In Column 23, Line 27, delete "data The" and insert -- data. The --, therefor.

In Column 23, Line 37, delete "OTT, connection" and insert -- OTT connection --, therefor.

In Column 23, Line 39, delete "use equipment" and insert -- user equipment --, therefor.

In Column 23, Line 47, delete "bad" and insert -- load --, therefor.

In Column 23, Line 50, delete "teachings, of" and insert -- teachings of --, therefor.

In Column 24, Line 3, delete "both, in" and insert -- both. In --, therefor.

In Column 24, Line 18, delete "Propagation" and insert -- propagation --, therefor.

In Column 24, Line 19, delete "3311. 3331" and insert -- 3311, 3331 --, therefor.

In Column 24, Line 24, delete "communication 20 system," and insert -- communication system, --, therefor.

In Column 24, Line 28, delete "FIG. 10 For" and insert -- FIG. 10. For --, therefor.

In Column 24, Line 47, delete "FIG. 10 For" and insert -- FIG. 10. For --, therefor.

In Column 24, Lines 59-60, delete "embodiment The" and insert -- embodiment. The --, therefor.

In Column 25, Line 9, delete "user date" and insert -- user data --, therefor.

In Column 25, Line 30, delete "word "comprise or" "comprising" it" and insert -- word "comprise" or "comprising" it --, therefor.

In Column 25, Line 34, delete "alternatives" and insert -- alternatives, --, therefor.

In Column 25, Line 40, delete "Abbreviation Explanation".

In Column 25, Line 55, delete "CPRS" and insert -- GPRS --, therefor.

In Column 26, Line 20, delete "URLCC" and insert -- URLLC --, therefor.

In the Claims

In Column 27, Lines 26-27, in Claim 9, delete "User Equipment, UE" and insert -- User Equipment, UE, --, therefor.

In Column 28, Line 1, in Claim 10, delete "first group of cell," and insert -- first group of cells, --, therefor.

In Column 28, Lines 11-12, in Claim 10, delete "New Radio, N s." and insert -- New Radio, NR. --, therefor.

In Column 28, Lines 22-23, in Claim 12, delete "Physical Downlink Control Channel PDCCH" and insert -- Physical Downlink Control Channel, PDCCH, --, therefor.

In Column 28, Lines 24-25, in Claim 12, delete "Physical Downlink Shared Channel PDSCH" and insert -- Physical Downlink Shared Channel, PDSCH, --, therefor.

In Column 28, Line 51, in Claim 16, delete "User Equipment, UE" and insert -- User Equipment, UE, --, therefor.

In Column 29, Lines 10-11, in Claim 16, delete "New Radio, NR." and insert -- New Radio, NR, --, therefor.

In Column 29, Line 21, in Claim 18, delete "apoint" and insert -- appoint --, therefor.